(12) United States Patent
Sharma et al.

(10) Patent No.: US 12,182,765 B2
(45) Date of Patent: Dec. 31, 2024

(54) AUTOMATED CREDENTIAL PROCESSING SYSTEM

(71) Applicant: LIVEPERSON, INC., New York, NY (US)

(72) Inventors: Dev Sharma, New York, NY (US); Marco Ambrosio, New York, NY (US); Sam Kirby, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/122,333

(22) Filed: Mar. 16, 2023

(65) Prior Publication Data

US 2023/0297965 A1 Sep. 21, 2023

Related U.S. Application Data

(60) Provisional application No. 63/320,888, filed on Mar. 17, 2022.

(51) Int. Cl.
  *G06Q 10/1053* (2023.01)
  *G06F 16/2457* (2019.01)
  *G06F 16/28* (2019.01)
  *G06N 20/00* (2019.01)

(52) U.S. Cl.
  CPC ... *G06Q 10/1053* (2013.01); *G06F 16/24578* (2019.01); *G06F 16/285* (2019.01); *G06N 20/00* (2019.01)

(58) Field of Classification Search
  CPC .......... G06Q 10/1053; G06F 16/24578; G06F 16/285; G06N 20/00
  See application file for complete search history.

(56) References Cited

U.S. PATENT DOCUMENTS

| 11,030,583 | B1* | 6/2021 | Garg | G06N 20/00 |
| 2011/0082825 | A1* | 4/2011 | Sathish | G06Q 10/1053 707/769 |
| 2016/0350425 | A1* | 12/2016 | Tripathi | G06F 16/9535 |
| 2017/0076225 | A1 | 3/2017 | Zhang et al. | |
| 2018/0218326 | A1* | 8/2018 | Kenthapadi | G06F 16/9535 |
| 2019/0043017 | A1* | 2/2019 | Grover | G06F 16/248 |
| 2019/0205838 | A1* | 7/2019 | Fang | G06Q 10/06398 |
| 2019/0220824 | A1 | 7/2019 | Liu | |

(Continued)

OTHER PUBLICATIONS

Chen, Jie, Chunxia Zhang, and Zhendong Niu. "A two-step resume information extraction algorithm." Mathematical Problems in Engineering 2018 (2018). (Year: 2018).*

(Continued)

*Primary Examiner* — Brendan S O'Shea
(74) *Attorney, Agent, or Firm* — POLSINELLI LLP

(57) ABSTRACT

Disclosed embodiments provide a framework for processing sets of credentials in real-time using machine learning models to identify requisitions that can be recommended to users. In response to receiving a set of credentials from a user, a system assigns a classification to the set of credentials based on a set of characteristics associated with the set of credentials. A machine learning model is used to assign tags to the text of the set of credentials. These tags correspond to the set of characteristics. Using these tags, a set of open requisitions are identified and provided to the user.

24 Claims, 9 Drawing Sheets

(56) References Cited

U.S. PATENT DOCUMENTS

| | | | |
|---|---|---|---|
| 2019/0303796 A1 | 10/2019 | Balasubramanian et al. | |
| 2020/0065770 A1* | 2/2020 | Janapareddy | G06F 40/174 |
| 2020/0394592 A1 | 12/2020 | Shi et al. | |
| 2021/0034701 A1 | 2/2021 | Fei et al. | |
| 2021/0319334 A1 | 10/2021 | Mitchell et al. | |
| 2021/0350078 A1 | 11/2021 | Choudhury et al. | |
| 2022/0327488 A1* | 10/2022 | Ramani | G06N 5/02 |
| 2023/0080309 A1* | 3/2023 | Bharti | G06N 3/08 |

OTHER PUBLICATIONS

International Search Report and Written Opinion of May 15, 2023 for PCT Application No. PCT/US2023/015354, 14 pages.

\* cited by examiner

700

18 Recommended Jobs  Most Relevant

Full Time

Managed Services Account Executive  + Quick Apply

- New York - Remote
- Managed Services

Good Match  Full Time

Sales Development Manager  Apply

- Remote
- Commercial S&M

Good Match  Full Time

Strategic Account Executive  + Quick Apply

- Remote - US
- Commercial S&M

Good Match  Full Time

Client Partner  Apply

- SF - Remote
- Enterprise

FIG. 7

AUTOMATED CREDENTIAL PROCESSING SYSTEM

CROSS-REFERENCE TO RELATED APPLICATIONS

The present patent application claims the priority benefit of U.S. Provisional Patent Application No. 63/320,888 filed Mar. 17, 2022, the disclosures of which are incorporated by reference herein.

FIELD

The present disclosure relates generally to systems and methods for facilitating recruitment and processing of user credentials. More specifically, techniques are provided to deploy a framework for processing credentials in real-time using machine learning models to identify requisitions that can be recommended to users.

SUMMARY

Disclosed embodiments may provide a framework for processing sets of credentials in real-time using machine learning models to identify requisitions that can be recommended to users. Through this framework, a user is provided with a tailored set of requisitions, in real-time, based on the credentials provided by the user. This may reduce the amount of time spent by users in identifying relevant requisitions that may be of interest to these users. Further, by dynamically training and using the aforementioned machine learning models to process any received sets of credentials to identify requisitions that may be recommended to users, the framework may reduce the number of users that apply to requisitions that are not relevant to these users or that these users are otherwise not qualified for. This, in turn, may reduce the amount of time spent by third-party systems that submit these requisitions in evaluating different users that have submitted applications corresponding to these requisitions.

According to some embodiments, a computer-implemented method is provided. The computer-implemented method comprises receiving a set of credentials associated with a user. The set of credentials includes text corresponding to a set of characteristics associated with the user. The computer-implemented method further comprises automatically assigning a classification to the set of credentials. The classification is automatically assigned using the text corresponding to the set of characteristics and a repository of available classifications corresponding to a set of open requisitions. The computer-implemented method further comprises using a machine learning model to assign one or more tags to the text. The one or more tags correspond to the set of characteristics. Further, the machine learning model is trained using sample data corresponding to previously processed sets of credentials, tags associated with the previously processed sets of credentials, and recommended requisitions. The computer-implemented method further comprises identifying one or more open requisitions from the set of open requisitions. The one or more open requisitions are identified using the one or more tags assigned to the text. The computer-implemented method further comprises providing the one or more open requisitions. These one or more open requisitions are provided such that, when the one or more open requisitions are received at a dashboard, the dashboard presents the one or more open requisitions to the user. The computer-implemented method further comprises updating the machine learning model using the sample data, the one or more open requisitions, and feedback corresponding to user interaction with the one or more open requisitions.

In some embodiments, the computer-implemented method further comprises using the machine learning model to calculate confidence scores corresponding to the one or more tags assigned to the text. Further, the computer-implemented method further comprises ranking the one or more open requisitions according to the confidence scores.

In some embodiments, the classification is automatically assigned to the set of credentials using a text classification model. Further, the text classification model is trained using the sample data.

In some embodiments, the machine learning model processes the text using named entity recognition to assign the one or more tags to the text.

In some embodiments, the one or more open requisitions are identified using a probability model. Further, the probability model matches the one or more tags to the set of requisitions to identify the one or more requisitions. The probability model is trained using the sample data.

In some embodiments, the one or more tags are associated with one or more skills, and wherein the one or more skills correspond to the one or more requisitions.

In some embodiments, the computer-implemented method further comprises obtaining the set of requisitions. The computer-implemented method further comprises assigning requisition tags to the set of requisitions. The one or more tags are matched to the requisition tags to identify the one or more requisitions.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures:

FIG. 7 shows an illustrative example of an interface through which a set of open requisitions are recommended to a user based on the automatic processing of a provided set of credentials in accordance with at least one embodiment;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
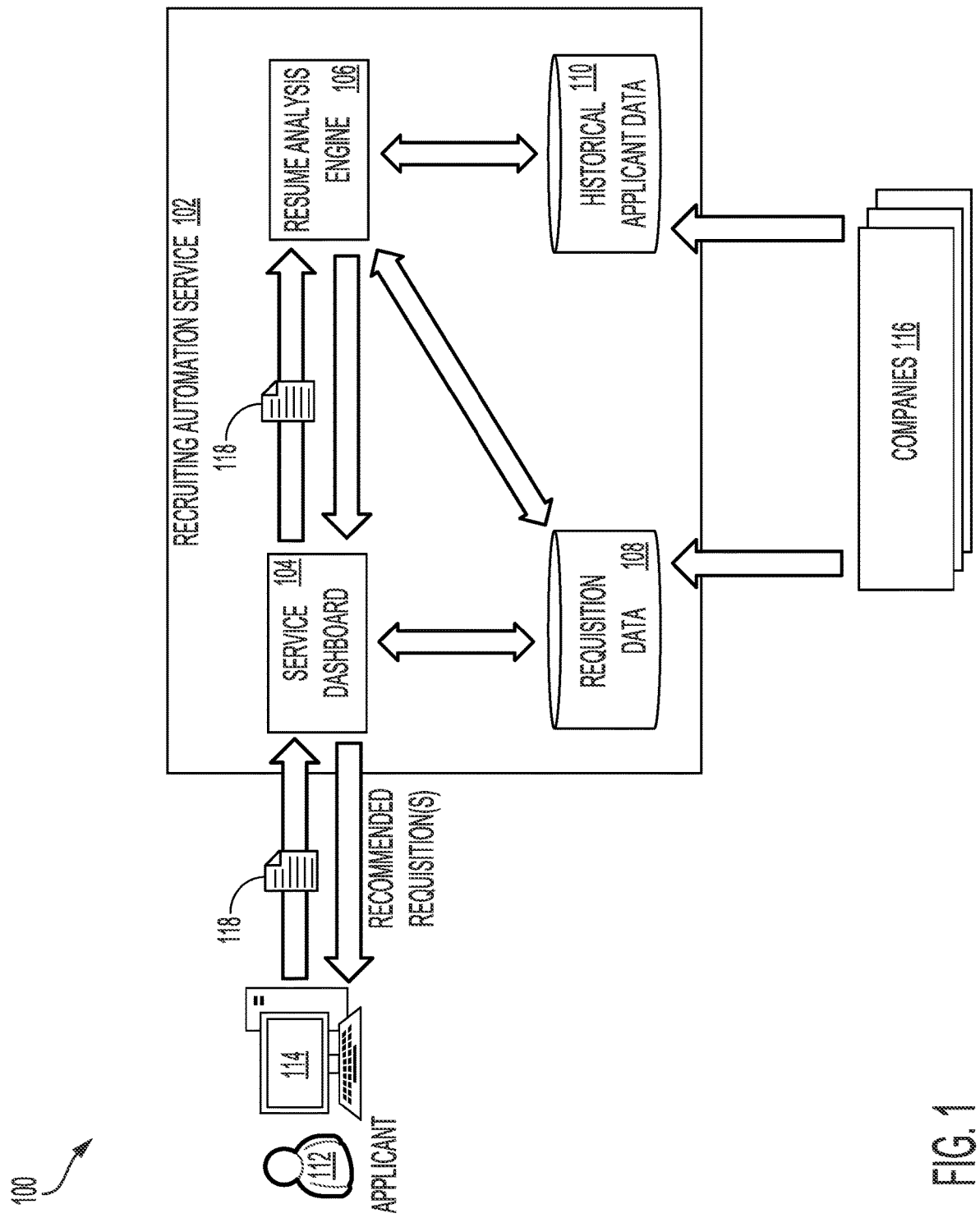
FIG. 1 shows an illustrative example of an environment in which a credential analysis engine associated with a recruiting automation system processes a set of credentials provided by a user to automatically identify and recommend one or more open requisitions in accordance with at least one embodiment.

FIG. 1 shows an illustrative example of an environment 100 in which a credential analysis engine 106 associated with a recruiting automation system 102 processes a set of credentials 118 provided by a user 112 to automatically identify and recommend one or more open requisitions in accordance with at least one embodiment. In the environment 100, a user 112, via a system dashboard 104 of a recruiting automation system 102, transmits a request to the recruiting automation system 102 to submit an application for a new requisition. The recruiting automation system 102, via the system dashboard 104, may provide a platform for third-party systems 116 to generate and manage requisitions that may be made available to users, such as user 112. The system dashboard 104 may be implemented on a computer system or other system (e.g., server, virtual machine instance, special-purpose computing device, etc.) of the recruiting automation system 102. Alternatively, the system dashboard 104 may be implemented as an application or other process executed on a computing system of the recruiting automation system 102.

In an embodiment, the system dashboard 104 provides an interface through which users, such as user 112, can review and identify existing or new requisitions that may be of interest to these users. For example, through the system dashboard 104, a user 112 may submit a query for requisitions related to electrical engineering positions that are available in one or more geographic regions. In some instances, if the recruiting automation system 102 is implemented such that various third-party systems 116 may generate and maintain their requisitions, a user 112 may utilize the system dashboard 104 to identify existing requisitions for particular third-party systems 116 that may be desirable to the user 112. Thus, through the system dashboard 104, a user 112 may submit a custom or tailored query that defines one or more particular parameters (e.g., skill code(s), location(s), specific third-party system, seniority level, etc.) that may be used by the recruiting automation system 102 to dynamically identify and present, through the system dashboard 104, any applicable requisitions that may be of interest to the user 112.

In an embodiment, the recruiting automation system 102, through the system dashboard 104, can provide the user 112 with an option to upload or otherwise provide a set of credentials 118 or other materials (e.g., sample work product, publications, etc.) that may be used to automatically identify one or more requisitions that may be recommended to the user 112. For example, when a user 112, through their computing device 114 (e.g., personal computer, laptop computer, smartphone, etc.), accesses the system dashboard 104 provided by the recruiting automation system 102, the recruiting automation system 102 may prompt the user 112 to submit a query that may be processed to identify, from a requisition data store 108, one or more existing requisitions that the user 112 may submit a request to fulfill the one or more requisitions. Additionally, the recruiting automation system 102 may provide one or more options to upload or otherwise submit a set of credentials 118 and/or other materials that may be processed to identify one or more existing requisitions that may be recommended to the user 112 and that the user 112 may submit a request to fulfill the one or more requisitions.

As illustrated in FIG. 1, the recruiting automation system 102 may include a credential analysis engine 106 that is configured to automatically process, in real-time, a set of credentials 118 and/or any other materials submitted by a user 112 in order to identify and recommend one or more requisitions that the user 112 may be qualified for. The credential analysis engine 106 may be implemented on a computer system or other system (e.g., server, virtual machine instance, special-purpose computing device, etc.) of the recruiting automation system 102. Alternatively, the credential analysis engine 106 may be implemented as an application or other process executed on a computing system of the recruiting automation system 102. In an embodiment, when a user 112 submits a set of credentials 118 and/or any other materials in order to obtain a recommendation that includes one or more existing requisitions that the user 112 may submit a request to fulfill, the credential analysis engine 106 may automatically parse the set of credentials 118 and/or any other materials provided by the user 112 into text data. The credential analysis engine 106 may parse the set of credentials 118 and/or any other materials provided by the user 112 using one or more programmatic functions (e.g., code, data objects, etc.). For instance, the credential analysis engine 106 may implement a data object that is configured to use a provided set of credentials 118 and/or any other materials provided by a user 112 as input to parse these materials into text data. This data object may be configured to generate text data from various data formats. This may allow a user 112 to provide their set of credentials 118 and/or any other materials in any compatible format. These compatible formats may be indicated to the user 112 via the system dashboard 104.

In some instances, the credential analysis engine 106 may maintain different programmatic functions or data objects corresponding to the different data formats that may be processed. Thus, when a user 112 submits a set of credentials 118 or other material through the system dashboard 104, the credential analysis engine 106 may evaluate the set of credentials 118 or other material (such as through evaluation of a file extension, etc.) to determine the data format of the set of credentials 118 or other material. Based on the identified data format of the set of credentials 118 or other material, the credential analysis engine 106 may select the programmatic function or data object corresponding to the identified data format and use the set of credentials 118 or other material as input to the selected programmatic function or data object.

In an embodiment, the credential analysis engine 106 implements a machine learning algorithm or artificial intelligence that is configured to use the parsed text from the provided set of credentials 118 or other provided materials as input to automatically, and in real-time, provide a text classification for the parsed text. The machine learning algorithm or artificial intelligence may be trained using unsupervised learning techniques. For instance, a dataset of input text corresponding to sample sets of credentials and/or other materials (e.g., materials provided by previous users, hypothetical or artificial materials generated for the purpose training, etc.) may be analyzed using a clustering or classification algorithm to classify the text according to a set of different classifications or tags. Example clustering algorithms that may be trained using this dataset may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. In some instances, the machine learning algorithm or artificial intelligence is a text classification model that is trained to use the parsed text as input and classifies the parsed text into a particular classification or tag. The machine learning algorithm or artificial intelligence may further utilize Natural Language Processing (NLP) to process the parsed text and assist in classifying the parsed text into a particular classification or tag.

The classifications or tags may correspond to different requisition categories for which the recruiting automation system 102 may maintain different requisitions. For example, when a hiring manager or other entity generates a new requisition that may be made available to potential users, the recruiting automation system may prompt the hiring manager or other entity to assign a requisition category for the new requisition. The hiring manager or other entity may select a requisition category from a set of known requisition categories. As an illustrative example, these requisition categories may include (but are not limited to): people, sales, enablement, security and information technology (IT), design, customer success, marketing and communications, finance accounting, data and machine learning, legal, product and program management, engineering, and the like. In some instances, the recruiting automation system 102 can use a machine learning algorithm or artificial intelligence to automatically recommend a requisition category for a new requisition, whereby the recruiting automation system 102 may use the new requisition as input to the machine learning algorithm or artificial intelligence. The machine learning algorithm or artificial intelligence may produce, as output, a recommended requisition category for the new requisition. The hiring manager or other entity may accept the recommended requisition category or designate an alternative requisition category for the new requisition. This action by the hiring manager or other entity may be used as feedback to further train the machine learning algorithm or artificial intelligence used to recommend requisition categories for newly created requisitions.

In an embodiment, the requisition classification or tag identified using the text classification model and the parsed text are used as input to another machine learning algorithm or artificial intelligence implemented by the credential analysis engine 106 to automatically identify a set of elements from the set of credentials 118 and/or other provided materials in order to perform named entity recognition (NER) tagging. The tags identified using NER tagging may correspond to different skills and designations that may be used to identify and recommend one or more requisitions to a user 112. Skill tags may correspond to different skills that may be desirable for different requisitions or are otherwise associated with skills designated by hiring managers or other entities as being required for different requisitions. For example, when a hiring manager or other entity generates a new requisition to the recruiting automation system 102, the hiring manager or other entity may be required to assign one or more skill tags to the requisition. In some instances, the recruiting automation system 102 may alternatively use NER tagging or other machine learning algorithms/artificial intelligence to assign skill and designation tags to a new requisition once submitted by a hiring manager or other entity. The assigned skill and designation tags may be presented to the hiring manager or other entity to verify that these tags accurately represent the different skills and designations that are desirable for the requisition. Feedback from the hiring manager or other entity with regard to the assigned skill and designation tags may be used to further train the machine learning algorithms or artificial intelligence used to perform NER tagging on a submitted requisition.

The other machine learning algorithm or artificial intelligence used to process the requisition classification or tag identified using the text classification model and the parsed text using NER tagging (referred to herein as a "skill recognition model") may be trained using unsupervised learning techniques. For instance, a dataset of requisition classifications/tags and corresponding parsed text may be analyzed using NER to identify one or more entities from each parsed text data point. For example, using NER, a sample pairing of requisition classification/tag and parsed text may be analyzed to identify a user's name, a user's location, a user's skills, years of experience, a user's degree(s), college name(s) and corresponding graduation year(s), designations (e.g., previous position titles, etc.), previous employers, contact information, and the like. Each of these identified objects within the parsed text may be designated as a tag. Further, for each of these tags, the machine learning algorithm or artificial intelligence may assign a confidence score, whereby a higher confidence score denotes a greater confidence in the accuracy of the tag identification performed using NER. The determination of confidence scores may be tuned over time, as additional data points (e.g., requisition classifications/tags and corresponding parsed text) are obtained and used to train the skill recognition model. For example, tags and corresponding confidence scores, as well as the original parsed text, may be evaluated to determine whether the skill recognition model is accurately assigning tags to the names or text provided in the parsed text. For example, if the skill recognition model assigns a high confidence score to a tag that has been assigned to a portion of text, and the tag does not actually correspond to the portion of text, the skill recognition model may be retrained to reduce the likelihood (e.g., confidence score) for similar classifications of text.

In an embodiment, the credential analysis engine 106 evaluates the tags and corresponding confidence scores as provided by the skill recognition model to determine which tags are to be associated with the provided set of credentials 118 and/or other materials. For instance, an administrator of the recruiting automation system 102 may define a confidence score threshold whereby any tag having a confidence score below this threshold is automatically ignored and, thus, does not become associated with the set of credentials 118 and/or other materials provided by a user 112. Additionally, certain tags, regardless of confidence score, may not be used as a factor in identifying requisitions that may be recommended to a user 112. For example, tags associated with a user's gender, name, college name(s), and location may not be used as factors in identifying requisitions that may be recommended to a user 112. These tags may be omitted to ensure anonymity of the user 112 throughout the application process and, thus, reduce any possible bias in hiring of users.

In an embodiment, the credential analysis engine 106 includes a requisition recommendation engine that processes the tags assigned by the skill recognition model to the set of credentials 118 and/or other materials provided by the user 112 (except tags omitted as factors, as described above) using a rules-based probability model to identify one or more requisitions that may be recommended to the user 112. For instance, the credential analysis engine 106 may use, as input to the requisition recommendation engine, tags corresponding to a user's skills, designations, years of experience, graduation year(s), and applicable degree(s). These tags, as described above, may be assigned to the user's set of credentials 118 and/or other materials as a result of these tags having confidence scores above a pre-defined threshold value. Further, as noted above, each requisition may be associated with different tags. For instance, the recruiting automation system 102 may use NER tagging or other machine learning algorithms/artificial intelligence to assign skill and designation tags to a new or requisition once submitted by a hiring manager or other entity. Alternatively, a hiring manager or other entity may manually assign skill and designation tags to a new requisition when submitting the new requisition to the recruiting automation system 102. Thus, the requisition recommendation engine may attempt to match the tags associated with the provided set of credentials 118 and/or other materials to the tags associated with any existing requisitions to identify requisitions that serve as the best matches for the user 112.

In an embodiment, each tag type or category may be weighted such that certain tag types or categories may have a greater influence in identifying requisitions that may serve as the best matches for the user 112. For example, skill tags may be assigned the greatest weight, as skills matches may serve as a greater indicator of a user's fitness for a particular requisition compared to other types or categories of tags. Additionally, designation tags may be assigned a weight that is greater than other tag types or categories with the exception of skills tags. As an illustrative example, skills tags may be assigned a 60% weight, designation tags may be assigned a 35% weight, and all other tag types or categories may collectively be assigned the remaining 5% weight, as skills and designations may represent the greatest importance in determining a user's fitness for requisitions made available through the recruiting automation system 102. However, it should be noted that the different tag types or categories may be assigned different weights according to the requirements of the recruiting automation system 102 and/or hiring managers or other entities that submit requisitions to the recruiting automation system 102.

In some instances, the weights applied to the different tag types or categories may be customized per requisition. For example, the recruiting automation system 102 may provide various tools to indicate the level of importance for different tag types of categories, including for specific tags corresponding to specific skills, designations, etc. that may be required for a requisition. Based on the level of importance assigned to each tag and/or tag type/category by a hiring manager or other entity, the recruiting automation system 102 may determine a weight for each tag and/or tag type/category. For example, if a hiring manager or other entity indicates that a user's skills is of paramount importance for the or requisition, the recruiting automation system 102 may assign a greater weight to tags associated with a user's skills. As another example, if a hiring manager or other entity indicates that the desirable candidate for a requisition is one that has practical experience with Python and has served as a senior software engineer, the recruiting automation system 102 may assign a greater weight to tags corresponding to Python-related skills and to designation tags corresponding to senior software engineering roles.

As noted above, the credential analysis engine 106 may use a machine learning algorithm or artificial intelligence that is configured to use the parsed text from the provided set of credentials 118 or other provided materials as input to automatically, and in real-time, assign a requisition category or classification to the set of credentials 118 or other provided materials. This requisition category or classification may be used to determine which skills, designations, and other information may be discerned from the parsed text that may be relevant for requisitions within the requisition category or classification. For example, an identified requisition category or classification may be used to determine how the skill recognition model uses NER tagging to assign tags and corresponding confidence scores to different names or text provided in the parsed text. The assigned requisition category or classification may also be used by the credential analysis engine 106, through the requisition recommendation engine, to identify the existing requisitions belonging to the assigned requisition category or classification from the requisition data store 108. The requisitions stored in the requisition data store 108 may be categorized or clustered according to different requisition categories or classifications as designated by hiring managers/other entities or automatically by the recruiting automation system 102. Thus, based on the requisition category or classification tag assigned to the set of credentials 118 and/or other materials provided by a user 112, the requisition recommendation engine may automatically identify the requisitions that belong to this particular requisition category or classification. This may limit the pool of requisitions that may be evaluated to identify any requisitions that may be recommended to the user 112.

In an embodiment, the credential analysis engine 106 evaluates each of the requisitions within the identified requisition category or classification against the tags assigned by the skill recognition model to the set of credentials 118 and/or other materials provided by the user 112 to determine a match score for each requisition. As noted above, different weights may be applied to particular tags or tag types/categories. Accordingly, the match score for a particular requisition may be adjusted according to these different weights. In some instances, if individual weight sets are defined per requisition, the credential analysis engine 106 may apply each individual weight set to the corresponding match score to generate the weighted match score for each requisition.

The credential analysis engine 106, through the requisition recommendation engine, may evaluate the resulting match scores for the requisitions within the identified requisition category or classification to identify a set of requisitions that may be recommended to the user 112. For instance, the requisition recommendation engine may identify a pre-defined number (e.g., five, ten, etc.) of requisitions having the highest match scores with the set of credentials 118 and/or other materials provided by the user 112. Additionally, from the identified number of requisitions, the requisition recommendation engine may designate a subset of the requisitions as being the best matches for the user 112. As an illustrative example, if the requisition recommendation engine identifies a set of five requisitions that have the highest match scores, the requisition recommendation engine may select the top two scoring requisitions from this set that may be designated as being the best matches for the user 112.

Once the requisition recommendation engine has identified a set of requisitions that may be recommended to the user 112, as well as the subset of requisitions that may be designated as being the best matches for the user 112, the credential analysis engine 106 may update the system dashboard 104 to present this set of requisitions to the user 112. Through the system dashboard 104, the recruiting automation system 102 may provide, for each requisition, a set of details corresponding to the requisition. For example, for a particular requisition, the recruiting automation system 102 may present the title of the requisition, the site corresponding to the position indicated in the requisition (e.g., a geographical location, remote, etc.), the name of the entity associated with the requisition (e.g., group, business unit, program, etc.), and the like. Further, for each requisition, the recruiting automation system 102 may indicate that the requisition is a positive match for the user 112. This may allow the user 112 to easily discern recommended requisitions from other requisitions not selected by the requisition recommendation engine. In some instances, the requisitions designated as being the best matches for the user 112 may be highlighted and prominently displayed through the system dashboard 104. This may allow the user 112 to immediately identify the requisitions that represent the best matches for the user 112.

Through the system dashboard 104, the user 112 may apply to any of the presented requisitions. For example, each requisition presented via the system dashboard 104 may have a corresponding apply button. A user 112 may select an apply button corresponding to a requisition to submit an application to the requisition. For instance, if the user 112 selects an apply button, the recruiting automation system 102 may automatically transfer the user 112 to a bot recruiting agent that may be configured to solicit responses to questions submitted by a hiring manager that generated the requisition via the recruiting automation system 102. Additionally, the recruiting automation system 102 may obtain, from a user data store 110, the set of credentials 118 and any other materials provided by the user 112 to initiate the process of generating recommendations for requisitions that may serve as best matches for the user 112.

In an embodiment, the recruiting automation system 102 can obtain feedback from users (such as user 112) and third-party systems 116 that may be used to retrain the various machine learning algorithms or artificial intelligence used by the credential analysis engine 106 to identify a requisition category or classification for a provided set of credentials 118, assign tags to parsed text obtained through processing of a provided set of credentials 118, and identify requisitions to users. For instance, if a user 112 foregoes applying to a requisition recommended by the credential analysis engine 106 or otherwise rejects one or more recommended requisitions, the recruiting automation system 102 may use this feedback to retrain the requisition recommendation engine such that the likelihood of similar requisitions being recommended to similar users is reduced. Further, the recruiting automation system 102 may retrain the skill recognition model implemented by the credential analysis engine 106 to improve the identification of names or text provided in the parsed text corresponding to a user's set of credentials 118 or other provided materials and assignment of tags to these names or text. The tags corresponding to skills, designations, degrees, and the like may further be updated based on the feedback such that the tags are more representative of these skills, designations, degrees, and the like. This may improve the performance of the skill recognition model in assigning accurate tags to parsed text. Further, the improvement in tag accuracy may cause the requisition recommendation engine to better identify requisitions that may be relevant to the user 112 based on their skills, designations, and other characteristics.

Third-party systems 116 may also provide feedback regarding the quality of users that have applied to their submitted requisitions through the recommendations provided by the credential analysis engine 106 to these users. For instance, if users to a particular requisition are not particularly well suited for a requisition (e.g., are unqualified, do not have the requisite skills and/or designations, etc.), a third-party system may provide feedback to the recruiting automation system 102 indicating that the recommendation provided to these users to apply to the requisition should not have been provided. This may cause the recruiting automation system 102 to retrain the machine learning algorithms or artificial intelligence used by the credential analysis engine 106 to assign tags to different materials provided by users and to generate recommendations for different requisitions that may be provided to these users. Further, in some instances, a third-party system may update an active requisition to change the tags associated with the requisition. This may cause the recruiting automation system 102 to dynamically, and in real-time, re-calculate match scores previously calculated for different users according to the matching of the tags associated with these users' sets of credentials and other provided materials and the updated requisition. This, in turn, may cause the credential analysis engine 106 to revise the recommendations provided to these users.

Any feedback submitted by users and third-party systems, as well as data corresponding to the requisitions evaluated and recommended to users, may be stored in the user data store 110. As users interact with the recruiting automation system 102 through the system dashboard 104 to obtain recommendations for requisitions that may match these users' skills and designations, the recruiting automation system 102 may dynamically, and in real-time, update prior user data in the user data store 110 to indicate, for each user, the requisitions recommended to the user, the set of credentials 118 and/or other materials provided by the user, and the user's response to the provided recommendation (e.g., user applied to one or more requisitions, user has rejected one or more requisitions, user has applied to a requisition not recommended by the credential analysis engine 106, etc.).

The credential analysis engine 106, in an embodiment, can retrieve user feedback and any available data from the user data store 110 to continuously train the machine learning algorithms or artificial intelligence used by the credential analysis engine 106 to assign tags to sets of credentials and other materials provided by users and to recommend requisitions to these users based on the assigned tags.

Figure 2:
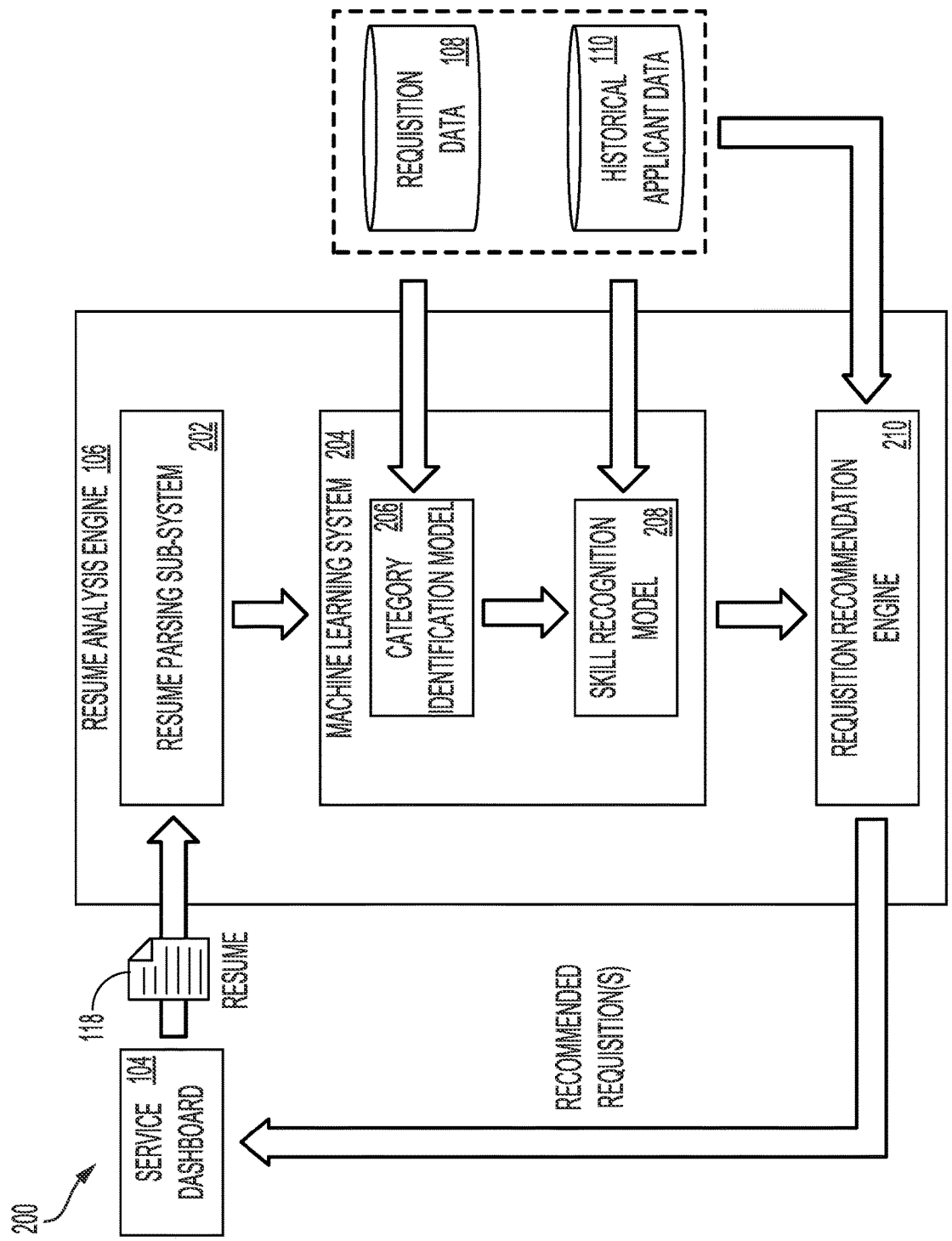
FIG. 2 shows an illustrative example of an environment in which a set of machine learning models implemented through a credential analysis engine process a set of credentials in order to automatically identify and recommend one or more open requisitions in accordance with at least one embodiment.

FIG. 2 shows an illustrative example of an environment 200 in which a set of machine learning models implemented through a credential analysis engine 106 process a set of credentials 118 in order to automatically identify and recommend one or more open requisitions in accordance with at least one embodiment. In the environment 200, a user may utilize a system dashboard 104 provided by a recruiting automation system to submit a set of credentials 118 and/or other materials that may be used to identify and recommend one or more requisitions that the user may be qualified for and that may be appealing to the user. For instance, a user, through the system dashboard 104, may be presented with an option to transmit a set of credentials 118 and/or other materials to the recruiting automation system in order to obtain a recommendation for different requisitions that the user may be qualified for.

In some examples, a user may engage in a communications session with a user intake bot. The user intake bot may automatically engage with users to obtain information usable to identify requisitions that may be recommended to these users. For instance, when a user accesses the system dashboard 104 implemented by the recruiting automation system, the recruiting automation system may execute a bot or other automated process to communicate with the user and elicit, from the user, responses that may be used to identify requisitions that may be of interest to the user. For example, when a user accesses the system dashboard 104, the bot or other automated process may communicate with the user and ask the user different questions related to its requisition search. As an illustrative example, the bot may prompt the user to provide information related to the user's technical experience, work experience, education, hobbies, and the like. In some instances, the bot may prompt the user to provide their set of credentials 118 and/or any other materials that may be used to identify requisitions that the user may be qualified for and that the user may find appealing.

In an embodiment, the bot can use a machine learning algorithm or artificial intelligence to process the user's responses in order to identify and extract information that may be used to identify requisitions that may be of interest to the user. The machine learning algorithm may be used to perform a semantic analysis of the responses (e.g., by identifying keywords, sentence structures, repeated words, punctuation characters and/or non-article words) to identify the information in the responses that may be used to identify relevant requisitions. The machine learning algorithm utilized by the bot may be dynamically trained using supervised learning techniques. For instance, a dataset of input responses and known relevant requisitions corresponding to the input responses can be selected for training of the machine learning algorithm. In some implementations, known relevant requisitions used to train the machine learning algorithm may include characteristics of these requisitions. The machine learning algorithm may be evaluated to determine, based on the input sample responses supplied to the machine learning algorithm, whether the machine learning algorithm is identifying the expected requisitions based on the responses. Based on this evaluation, the machine learning algorithm may be modified to increase the likelihood of the machine learning algorithm generating the desired results. The machine learning algorithm may further be dynamically trained by soliciting feedback from users with regard to the recommended requisitions obtained based on submitted responses. For instance, the recruiting automation system may record interaction with presented requisitions by a user to determine whether the presented requisitions correspond to the responses submitted by the user. The user interactions may, thus, be utilized to train the machine learning algorithm based on the accuracy of the machine learning algorithm in identifying relevant requisitions.

In an embodiment, the set of credentials 118 and/or other materials (e.g., information provided during conversation with a bot, sample work product, publications, etc.) are provided to a credential parsing sub-system 202 of the credential analysis engine 106 to parse through the set of credentials 118 and/or other provided materials in order to obtain parsed text. The credential parsing sub-system 202 may implement one or more programmatic functions (e.g., code, data objects, etc.) that may automatically identify the format of the provided set of credentials 118 and/or other materials and process the set of credentials 118 and/or other materials to obtain parsed text. For instance, the credential parsing sub-system 202 may implement a data object that is configured to use a provided set of credentials 118 and/or any other materials provided by a user as input to parse these materials into text data. This data object may be configured to generate text data from various data formats. This may allow a user to provide their set of credentials 118 and/or any other materials in any compatible format. These compatible formats may be indicated to the user via the system dashboard 104 to allow the user to provide their set of credentials 118 and/or other materials in any of the compatible formats. The credential parsing sub-system 202 may, in some instances, maintain different programmatic functions or data objects corresponding to the different data formats that may be processed. Thus, when a user submits a set of credentials 118 and/or other materials through the system dashboard 104, the credential parsing sub-system 202 may evaluate the set of credentials 118 and/or other materials (such as through evaluation of file extensions, etc.) to determine the data format of the set of credentials 118 and/or other materials provided by the user. Based on the identified data formats of the set of credentials 118 and/or other materials, the credential parsing sub-system 202 may select the programmatic function or data object corresponding to an identified data format and use the set of credentials 118 or other material as input to the selected programmatic function or data object.

The credential parsing sub-system 202 may transmit the parsed text corresponding to the provided set of credentials 118 and/or other materials to a machine learning system 204 of the credential analysis engine 106 to assign a requisition category or classification to the parsed text, as well as other tags corresponding to a user's skills, designations, years of experience, graduation year(s), applicable degree(s), and the like, that may be used to identify one or more requisitions that may be recommended to the user. The machine learning system 204 may be implemented on a computing system or other system (e.g., server, virtual machine instance, special-purpose computing device, etc.) of the credential analysis engine 106. Alternatively, the machine learning system 204 may be implemented as an application or other executable process on a computer system implemented by the credential analysis engine 106. The machine learning system 204 may comprise a category identification model 206 that may be dynamically trained in real-time to use the parsed text as input to classify the parsed text according to a set of different requisition categories or classifications. Additionally, the machine learning system 204 may comprise a skill recognition model 208 that may be dynamically trained in real-time to use the requisition category or classification assigned by the category identification model 206 and the parsed text to assign the tags corresponding to a user's skills, designations, years of experience, graduation year(s), applicable degree(s), and the like.

The category identification model 206 may be dynamically trained in real-time using unsupervised learning techniques. For instance, a dataset of input text corresponding to sample sets of credentials and/or other materials (e.g., materials provided by previous users, hypothetical or artificial materials generated for the purpose training, etc.) from a user data store 110 may be analyzed using a clustering or classification algorithm to classify the text according to a set of different classifications or tags. For instance, the category identification model 206 may be dynamically trained in real-time by classifying the text according to one or more vectors of similarity between the text and other clusters of text corresponding to different classifications or tags associated with the category identification model 206. Thus, in some embodiments, the machine learning system 204 can perform such clustering and obtain partial matches among other clusters of text according to these one or more vectors to identify a particular cluster and, from this cluster, identify any classifications or tags for the text. In some instances, the category identification model 206 is a text classification model that is trained to use the parsed text as input and classifies the parsed text into a particular classification or tag. The category identification model 206 may utilize NLP to process the parsed text and assist in classifying the parsed text into a particular classification or tag.

As noted above, the classifications or tags that may be assigned by the category identification model 206 may correspond to different requisition categories for which the recruiting automation system may maintain different requisitions. For example, when a hiring manager or other entity generates a new requisition that may be made available to potential users, the recruiting automation system may prompt the hiring manager or other entity to assign a requisition category for the new requisition. The hiring manager or other entity may select a requisition category from a set of known requisition categories. In some instances, the recruiting automation system can use a machine learning algorithm or artificial intelligence to automatically recommend a requisition category for a new requisition, whereby the recruiting automation system may use the new requisition as input to the machine learning algorithm or artificial intelligence. The machine learning algorithm or artificial intelligence may produce, as output, a recommended requisition category for the new requisition. The hiring manager or other entity may accept the recommended requisition category or designate an alternative requisition category for the new requisition.

The available classifications or tags that may be assigned to the parsed text to indicate the requisition category or classification for the parsed text may be stored in the requisition data store 108. These available classifications or tags may be the same as those provided to a hiring manager or other entity in order to classify a new requisition. Further, these available classifications or tags may be the same as those used by the recruiting automation system to automatically recommend a requisition category for a new requisition. As such, the category identification model 206 may use these available classifications or tags from the requisition data store 108 along with the parsed text to identify a particular classification or tag that may be assigned to the parsed text to indicate the requisition category or classification for the parsed text.

In an embodiment, the category identification model 206 can automatically update the user data store 110 to incorporate the assignment of a classification or tag corresponding to the requisition category or classification for the parsed text. This assignment, along with the parsed text, may be added to the user data store 110 as a new data point such that this new data point, along with the data set of previously assigned requisition category or classification tags, may be used to retrain the category identification model 206 according to feedback provided with regard to this assignment. As noted above, a hiring manager or other entity may provide feedback with regard to the classification of a set of credentials 118 or other provided materials as related to the recommendation of requisitions to a user. Further, a user may provide feedback with regard to the requisitions recommended to the user. This feedback may include an indication as to whether the set of credentials 118 or other provided materials were accurately classified by the category identification model 206. Thus, the assignment of a classification or tag corresponding to a requisition category, as indicated in the user data store 110 for a particular set of credentials 118 and/or other materials provided by a user may be supplemented with feedback from the user and hiring managers to retrain or otherwise update the category identification model 206 in order to more accurately assign a classification or tag to parsed text.

It should be noted that the category identification model 206 may be dynamically, and continuously, trained in real-time as sets of credentials and other materials associated with different users are received. Further, the category identification model 206 may be dynamically, and continuously, trained in real-time as feedback is received corresponding to the requisition category or classification tags assigned to different sets of credentials and generated in real-time by the category identification model 206. For example, the category identification model 206 may simultaneously, and continuously, process parsed text corresponding to different sets of credentials associated with different users to assign, in real-time, different requisition category or classification tags to the parsed text. Further, as these assigned requisition category or classification tags for different sets of credentials are provided to the skill recognition model 208 (as described in greater detail herein), any feedback received corresponding to these myriad assigned requisition category or classification tags for the different sets of credentials may be used to dynamically, and in real-time, re-train or otherwise update the category identification model 206. For instance, based on this feedback, the one or more vectors and corresponding clusters associated with the category identification model 206 may be modified to provide more accurate clustering of text corresponding to different classifications or tags associated with the category identification model 206. Thus, as users continuously interact with the recruiting automation system to submit their sets of credentials and as these users obtain any recommended requisitions based on their sets of credentials, the category identification model 206, in real-time, may continuously assign different requisition category or classification tags to received sets of credentials and may continuously be re-trained or otherwise updated as feedback is received corresponding to these tags and to any requisitions provided to these users. This allows for the category identification model 206 to constantly process parsed text associated with different sets of credentials as these sets of credentials are received and assign relevant requisition category or classification tags to these different sets of credentials. Further, this allows for the category identification model 206 to be constantly updated in real-time based on feedback corresponding to these requisition category or classification tags and as new sets of credentials are constantly being processed by the category identification model 206 and the skill recognition model 208.

In an embodiment, once the category identification model 206 has assigned a requisition category or classification tag to the parsed text, the category identification model 206 provides this requisition category or classification tag and the parsed text to a skill recognition model 208 implemented by the machine learning system 204. As noted above, the skill recognition model 208 may use the requisition category or classification tag and the parsed text as input to automatically identify a set of elements from the parsed text in order to perform NER tagging of the parsed text. The tags identified using NER tagging may correspond to different skills and designations that may be used to identify and recommend one or more requisitions to a user. In an embodiment, the pool of tags that may be identified using NER tagging is identified based on the requisition category or classification tag assigned to the parsed text. For instance, a particular requisition category or classification tag may be associated with a specific set of skill and designation tags that are related to the particular requisition category or classification tag. As an illustrative example, if the parsed text is assigned an engineering tag by the category identification model 206, the pool of skill and designation tags may correspond to engineering skills and designations (e.g., engineering degree tags, programming skill tags, engineering position tags, etc.). Thus, in an embodiment, the skill recognition model 208 can identify and retrieve, from the requisition data store 108, the pool of skill and designation tags that corresponds to the requisition category or classification tag assigned to the parsed text by the category identification model 206. This may limit the pool of available tags that may be used by the skill recognition model 208 to perform NER tagging of the parsed text and, thus, improve the efficiency of the skill recognition model 208 in assigning skill and designation tags to the parsed text and reduce the likelihood of inaccurate tagging of the parsed text.

The skill tags maintained by in the requisition data store 108 and used for NER tagging may correspond to different skills that may be desirable for different requisitions or are otherwise associated with skills designated by hiring managers or other entities as being required for different requisitions. For example, when a hiring manager or other entity generates a new requisition, the hiring manager or other entity may be required to assign one or more skill tags to the requisition. In some instances, the recruiting automation engine may additionally, or alternatively, use NER tagging or other machine learning algorithms/artificial intelligence to assign skill and designation tags to a new requisition once submitted by a hiring manager or other entity. The assigned skill and designation tags may be presented to the hiring manager or other entity to verify that these tags accurately represent the different skills and designations that are desirable for the requisition. Feedback from the hiring manager or other entity with regard to the assigned skill and designation tags may be used to further train the machine learning algorithms or artificial intelligence used to perform NER tagging on a submitted requisition. The one or more skill and designation tags assigned to a new requisition may correspond to the assigned requisition category or classification tag assigned to the new requisition. Thus, these skill and designation tags may be associated to the assigned requisition category or classification tag in the requisition data store 108.

The skill recognition model 208 may be trained using supervised learning techniques. For instance, a dataset of requisition classifications/tags and corresponding parsed text may be analyzed using NER to identify one or more entities from each parsed text data point. For example, using NER, a sample pairing of requisition classification/tag and parsed text may be analyzed to identify a user's name, a user's location, a user's skills, years of experience, a user's degree(s), college name(s) and corresponding graduation year(s), designations (e.g., previous position titles, etc.), previous employers, contact information, and the like. Each of these identified objects within the parsed text may be designated as a tag. Further, for each of these tags, the skill recognition model 208 may assign a confidence score, whereby a higher confidence score denotes a greater confidence in the accuracy of the tag identification performed using NER.

The skill recognition model 208 may be dynamically trained in real-time using sample requisition classifications/tags, sample parsed text corresponding to these sample requisition classifications/tags, and sample entities corresponding to the sample parsed text. As an illustrative example of the training of the skill recognition model 208, an evaluator of the skill recognition model 208 (e.g., an administrator of the recruiting automation system, an independent party introduced to perform such evaluation, etc.) may review the entities identified from the sample parsed text corresponding to the sample requisition classification or tag assigned to the parsed text. For example, the evaluator may determine whether the skill recognition model 208 has accurately identified the one or more entities in the parsed text and designated the appropriate tag for these one or more entities. As an illustrative example, if the original text indicates that a sample user is a systems architecture engineer and the skill recognition model 208 has assigned a high confidence score to a designation tag applied to this title that corresponds to an aerodynamics specialist, the evaluator may determine that the skill recognition model 208 has not accurately assigned the appropriate tag for this user title. Accordingly, the evaluator may re-train the skill recognition model 208 such that, for similar text, the skill recognition model 208 may be less likely to apply this tag to similar user titles and/or to assign high confidence scores to this tag for similar user titles. As another illustrative example, if the original text indicates that a sample user has a release processes skill and the skill recognition model 208 has applied a low confidence score to a skills tag applied to this skill that corresponds to the releases processes skill, the evaluator may determine that the skill recognition model 208 is not attributing sufficient confidence in this particular tag, resulting in this tag being less prominently featured as the likely user skill. Accordingly, the evaluator may re-train the skill recognition model 208 such that, for similar text and corresponding tag, the skill recognition model 208 may be more likely to assign higher confidence scores to this tag for similar user skills.

The determination of confidence scores performed by the skill recognition model 208 may be tuned in real-time as additional data points (e.g., requisition category or classification tags, skill and designation tags, and corresponding parsed text) are obtained and used to train the skill recognition model 208. For example, tags and corresponding confidence scores, as well as the original parsed text, may be evaluated to determine whether the skill recognition model 208 is accurately assigning tags to the names or text identified in the parsed text. For example, if the skill recognition model 208 assigns a high confidence score to a tag that has been assigned to a portion of text, and the tag does not actually correspond to the portion of text, the skill recognition model 208 may be retrained to reduce the likelihood (e.g., confidence score) for similar classifications of text. Alternatively, if the skill recognition model 208 assigns a low confidence score to a tag that has been assigned to a portion of text, and the tag does accurately correspond to the portion of text, the skill recognition model 208 may be retrained to improve the confidence score for similar classifications of text.

In an embodiment, the skill recognition model 208 is dynamically trained in real-time to evaluate the tags and corresponding confidence scores to determine which tags are to be associated with the parsed text. As noted above, an administrator of the recruiting automation system may define a confidence score threshold whereby any tag having a confidence score below this threshold is automatically ignored and, thus, does not become associated with the parsed text. Additionally, certain tags, regardless of confidence score, may not be used as a factor in identifying requisitions that may be recommended to a user. For example, tags associated with a user's gender, name, college name(s), and location may not be used as factors in identifying requisitions that may be recommended to a user. These tags may be omitted to ensure anonymity of the user throughout the application process and, thus, reduce any possible bias in hiring of users. The skill recognition model 208 may be dynamically trained to implement the confidence score threshold and to omit certain tags, as designated by administrators and the recruiting automation system. Thus, the skill recognition model 208 may automatically ignore or otherwise discard any tags having a confidence score below the confidence score threshold value and any other tags that are not to be factored into generating requisition recommendations.

It should be noted that the skill recognition model 208 may be dynamically, and continuously, trained in real-time as sets of credentials and other materials associated with different users are received and as these sets of credentials and other materials are automatically processed to obtain corresponding parsed text and to assign requisition category or classification tags to this parsed text. Further, the skill recognition model 208 may be dynamically, and continuously, trained in real-time as feedback is received corresponding to the skill and designation tags assigned to different sets of credentials and generated in real-time by the skill recognition model 208. For example, the skill recognition model 208 may simultaneously, and continuously, process parsed text and corresponding requisition category or classification tags for different sets of credentials associated with different users. Further, as these assigned skill and designation tags for different sets of credentials are provided to the requisition recommendation engine 210 (as described in greater detail herein), any feedback received corresponding to these myriad assigned skill and designation tags for the different sets of credentials may be used to dynamically, and in real-time, re-train or otherwise update the skill recognition model 208. Thus, as users continuously interact with the recruiting automation system to submit their sets of credentials and as these users obtain any recommended requisitions based on their sets of credentials, the skill recognition model 208, in real-time, may continuously assign different skill and designation tags to received sets of credentials and may continuously be re-trained or otherwise updated as feedback is received corresponding to these tags and to any requisitions provided to these users. This allows for the skill recognition model 208 to constantly process parsed text and corresponding requisition category or classification tags associated with different sets of credentials as these sets of credentials are received and assign relevant skill and designation tags to these different sets of credentials. Further, this allows for the skill recognition model 208 to be constantly updated in real-time based on feedback corresponding to these skill and designation tags and as new sets of credentials are constantly being processed by the category identification model 206 and the skill recognition model 208.

The skill recognition model 208 may transmit the parsed text, requisition category or classification tag, and the assigned skill and designation tags to a requisition recommendation engine 210. The requisition recommendation engine 210 may process these tags using a rules-based probability model to identify one or more requisitions that may be recommended to a user. In response to obtaining the parsed text, requisition category or classification tag, and the assigned skill and designation tags, the requisition recommendation engine 210 may access the requisition data store 108 to identify existing requisitions that may be evaluated to identify one or more requisitions that may be recommended to a user. In some instances, the requisition recommendation engine 210 may query the requisition data store 108 using the assigned requisition category or classification tag to obtain the existing requisitions that are associated with the requisition category or classification tag. This may reduce the number of requisitions that are to be evaluated by the requisition recommendation engine 210.

The requisition recommendation engine 210, as noted above, may weigh each tag type or tag category such that certain tag types or tag categories have a greater influence on the requisition recommendation engine 210 in identifying requisitions that may be recommended to a user. The weights applied to each tag type or tag category may be assigned by the recruiting automation system. For example, skill tags may be assigned a greater weight compared to other tag types or tag categories, as a user's skills may serve as a greater indicator of the user's fitness for a particular requisition compared to the user's other attributes (e.g., designations, years of experience, previous employers, etc.). Further, designation tags may be assigned a weight that is less than the weight assigned to skill tags but still greater than the weights assigned to other tag types or tag categories. As an illustrative example of a weight schema, the recruiting automation system may assign a 60% weight to skill tags, a 35% weight to designation tags, and the remaining 5% weight collectively to all other tag types or tag categories. It should be noted that while this distribution of weights is used extensively throughout the present disclosure for the purpose of illustration, other weight schemas may be applied, whereby different weights may be applied to different tag types and tag categories according to the requirements of the recruiting automation system and/or hiring managers that submit requisitions to the recruiting automation system to identify possible candidates for these openings or requisitions.

In an embodiment, a hiring manager or other entity, when creating a new requisition through the recruiting automation system, may assign a set of custom weights to the different tag types or tag categories that may be associated with the new requisition. For example, through the system dashboard 104, a hiring manager or other entity may define the level of importance for different tag types or tag categories. This may allow the hiring manager or other entity to assign specific weights to particular tags corresponding to particular skills, designations, and the like that may be desirable or required for the new requisition. Based on the level of importance or weights designated by a hiring manager or other entity for different tag types, tag categories, and/or specific tags, the recruiting automation system may define a weight schema that is specific to the requisition. The requisition recommendation engine 210 may thus evaluate a requisition from the requisition data store 108 to determine whether the requisition is associated with a specific weight schema as defined by a hiring manager or other entity that submitted the requisition to the recruiting automation system. If the requisition is not associated with a specific weight schema, the requisition recommendation engine 210 may apply a default weight schema to the corresponding tag types and tag categories, as described above.

The requisition recommendation engine 210 may automatically evaluate each of the requisitions obtained from the requisition data store 108 against the parsed text to identify a set of requisitions that may be recommended to the user. For instance, the requisition recommendation engine 210 may compare the tags assigned to the parsed text against the tags assigned to each of the obtained requisitions to identify a subset of requisitions that best match the parsed text (e.g., share a greater number of tags). In an embodiment, in addition to matching the tags assigned to the parsed text to the tags assigned to the different requisitions from the requisition data store 108, the requisition recommendation engine 210 automatically applies any applicable weight schema (e.g., a default weight schema, a weight schema specific to the requisition, etc.) to dynamically determine a match score for each parsed text—requisition pairing. The resulting set of match scores may be used by the requisition recommendation engine 210 to identify one or more requisitions that may be recommended to the user. For example, the requisition recommendation engine 210 may identify a pre-defined number of requisitions that may be recommended to a user. Accordingly, the requisition recommendation engine 210 may identify the pre-defined number of requisitions having the highest match scores.

In an embodiment, the requisition recommendation engine 210 can further subdivide the pre-defined number of requisitions to create a subset of requisitions that may be defined as being the best matches for the user. For example, the recruiting automation system may define a set number of requisitions that may be designated as representing the best matches for the user based on the set of credentials and other materials provided by the user. These requisitions may be prominently presented to the user via the system dashboard 104 to allow the user to easily review these requisitions and determine whether to submit an application to each of these requisitions. The requisition recommendation engine 210 may automatically identify, from the pre-defined number of requisitions, the requisitions having the highest match scores (e.g., top two scores, top three scores, etc.) and designate these requisitions as being the best matches for the user.

The requisition recommendation engine 210 may update the user data store 110 to indicate which requisitions are being recommended to the user based on the calculated match scores for the requisitions evaluated by the requisition recommendation engine 210. Further, the requisition recommendation engine 210 may update the user data store 110 to indicate the match scores for each of the requisitions evaluated by the requisition recommendation engine 210. This data may be used to retrain the requisition recommendation engine 210, as well as the category identification model 206 and skill recognition model 208 as described in greater detail herein.

In addition to updating the user data store 110, the requisition recommendation engine 210 may generate a recommendation that includes the requisitions designated as being good matches for the user based on the set of credentials and other materials provided by the user. The recommendation may indicate which requisitions are to be presented to the user as being the best matches for the user. The requisition recommendation engine 210 may transmit the recommendation to the system dashboard 104, where the system dashboard 104 may be updated to present this set of requisitions to the user. Through the system dashboard 104, the requisition recommendation engine 210 may provide, for each requisition, a set of details corresponding to the requisition. For example, for a particular requisition, the requisition recommendation engine 210 may present the title of the requisition, the site corresponding to the position associated with the requisition (e.g., a geographical location, remote, etc.), the name of the entity associated with the requisition (e.g., group, business unit, third-party system program, etc.), and the like. Further, for each requisition, the requisition recommendation engine 210 may indicate that the requisition is a positive match for the user. This may allow the user to easily discern recommended requisitions from other requisitions not selected by the requisition recommendation engine 210. In some instances, the requisitions designated as being the best matches for the user may be highlighted and prominently displayed through the system dashboard 104. This may allow the user to immediately identify the requisitions that represent the best matches for the user.

As noted above, the user may use the system dashboard 104 to apply to any of the presented requisitions, including any of the requisitions recommended by the requisition recommendation engine 210 and any other requisitions made available to the user. For example, each requisition presented via the system dashboard 104 may have a corresponding apply button. A user may select an apply button corresponding to a requisition to submit an application to the requisition. Selection of an apply button corresponding to a particular requisition may cause the recruiting automation system to automatically transfer the user to a bot recruiting agent that may be configured to solicit responses to questions submitted by a hiring manager for the selected requisition. Additionally, the recruiting automation system may obtain, from the user data store 110, the set of credentials 118 and any other materials previously provided by the user to initiate the process of generating recommendations for requisitions that may serve as best matches for the user.

In an embodiment, feedback from a user with regard to the requisitions recommended to the user by the requisition recommendation engine 210 can be used to retrain the category identification model 206, the skill recognition model 208, and the requisition recommendation engine 210. For example, if a user rejects the recommended requisitions (e.g., the user does not apply to any of the recommended requisitions, the user applies to requisitions that were not recommended by the requisition recommendation engine 210, etc.), the recruiting automation system may use this feedback to retrain the skill recognition model 208 to improve the identification of names or text provided in the parsed text corresponding to a user's set of credentials 118 or other provided materials and assignment of tags to these names or text. Additionally, the recruiting automation system may retrain the requisition recommendation engine 210 by adjusting the weight schema used by the probability model to match the tags associated with parsed text to different requisitions from the requisition data store 108. For instance, if the recruiting automation system determines, based on feedback from users, that the requisition recommendation engine 210 is recommending requisitions that do not accurately represent the users' combination of skills and designations, the recruiting automation system may adjust the weight schema used by the requisition recommendation engine 210 (e.g., reducing the weight applied to skill tags, increasing the weight applied to designation tags, increasing the weight applied to other relevant tags, etc.) to generate new match scores for requisitions for similar sets of credentials and other materials provided by users.

In addition to feedback from users, the recruiting automation system may obtain feedback from hiring managers, third-party systems, or other entities that submit requisitions to the recruiting automation system. For instance, a hiring manager or third-party system may provide feedback regarding the quality of users that have applied to their submitted requisitions as a result of these users having been presented with these requisitions as recommendations from the requisition recommendation engine 210. For example, if the requisition recommendation engine 210 recommends a particular requisition to a set of users, and the users within this set are not particularly well suited for the requisition, a hiring manager or third-party system may provide feedback indicating that the recommendation provided by the requisition recommendation engine 210 should not have been provided to these users (e.g., as a result of the users not being qualified for the requisition, as a result of the users not having the requisite experience, etc.). If the feedback indicates that users do not have the requisite skills and/or designations required for a requisition (e.g., the skill recognition model 208 has assigned incorrect tags to parsed text, etc.), the recruiting automation system may retrain the skill recognition model 208 to improve the accuracy of the skill recognition model 208 in assigning skill and designation tags to the parsed text, such as through improving the accuracy of the skill recognition model 208 in assigning confidence scores for particular tags to names and text provided in the parsed text. For example, if the skill recognition model 208 assigns a high confidence score to the text string "release processes" as corresponding to a release processes tag, but the text string "release processes" has a different context within the parsed text such that it may not be associated with a release processes skill (as denoted by a hiring manager or other entity), the recruiting automation system may retrain the skill recognition model 208 such that, for a "release processes" text string, the confidence score corresponding to the release processes tag may be reduced. Additionally, or alternatively, the skill recognition model 208 may be retrained such that, through NER tagging, a higher confidence score corresponding to the releases processes tag may require a text string that includes other contextual content in addition to the "release processes" text string (e.g., "internal release processes," "software release processes," "hardware release processes," etc.).

Feedback from users and/or hiring managers may also be used to retrain the category identification model 206. For instance, if the requisitions recommended to a user are rejected by the user, and the user indicates that the requisitions recommended to the user do not correspond to the type or category of requisition that the user is qualified or otherwise looking for, the recruiting automation system may use this feedback to retrain the category identification model 206 to improve the accuracy of the category identification model 206 in parsing text from a user's provided materials (e.g., set of credentials, etc.) and in classifying the parsed text into a correct requisition category or classification. As an illustrative example, if the user is an attorney and their set of credentials denotes the user's legal experience and education, but the category identification model 206 is incorrectly classifying the user's set of credentials as belonging to a finance accounting requisition category, the recruiting automation system may use feedback from the user (e.g., the user's rejection of recommended requisitions corresponding to finance accounting positions, the user's selection of legal requisitions, the user's queries for legal requisitions, etc.) to retrain the category identification model 206 such that, for similarly situated users and/or for similar materials, the category identification model 206 more accurately assigns a legal requisition category or classification tag to these materials rather than the erroneous finance accounting requisition category or classification tag.

In an embodiment, if a hiring manager or third-party system updates an active requisition to change the tags associated with the requisition (e.g., requisition category or classification tag, skill and designation tags, etc.), the requisition recommendation engine 210 can dynamically, and in real-time, re-calculate match scores previously calculated for different users according to the matching of the tags associated with these users' sets of credentials and other provided materials and the updated requisition. This may cause the requisition recommendation engine 210 to revise the requisition recommendations provided by the requisition recommendation engine 210 to these users in real-time.

Feedback provided by users, hiring managers, and third-party systems with regard to the recommendation of requisitions based on user-provided materials may be stored in the user data store 110. For instance, as users interact with the recruiting automation system through the system dashboard 104 to obtain recommendations for requisitions that may correspond to these users' skills and designations, the recruiting automation system may dynamically, and in real-time, update user data in the user data store 110 to indicate, for each user, the requisitions recommended to the user, the set of credentials 118 and/or other materials provided by the user, and the user's response to the provided recommendation (e.g., user has applied to one or more requisitions, user has rejected one or more requisitions, user has applied to a requisition not recommended by the requisition recommendation engine 210, etc.). The credential analysis engine 106, in an embodiment, can retrieve user feedback and any available data from the user data store 110 to continuously train the category identification model 206, the skill recognition model 208, and the requisition recommendation engine 210 collectively used to assign tags to sets of credentials and other materials provided by users and to recommend requisitions to these users based on the assigned tags.

Figure 3:
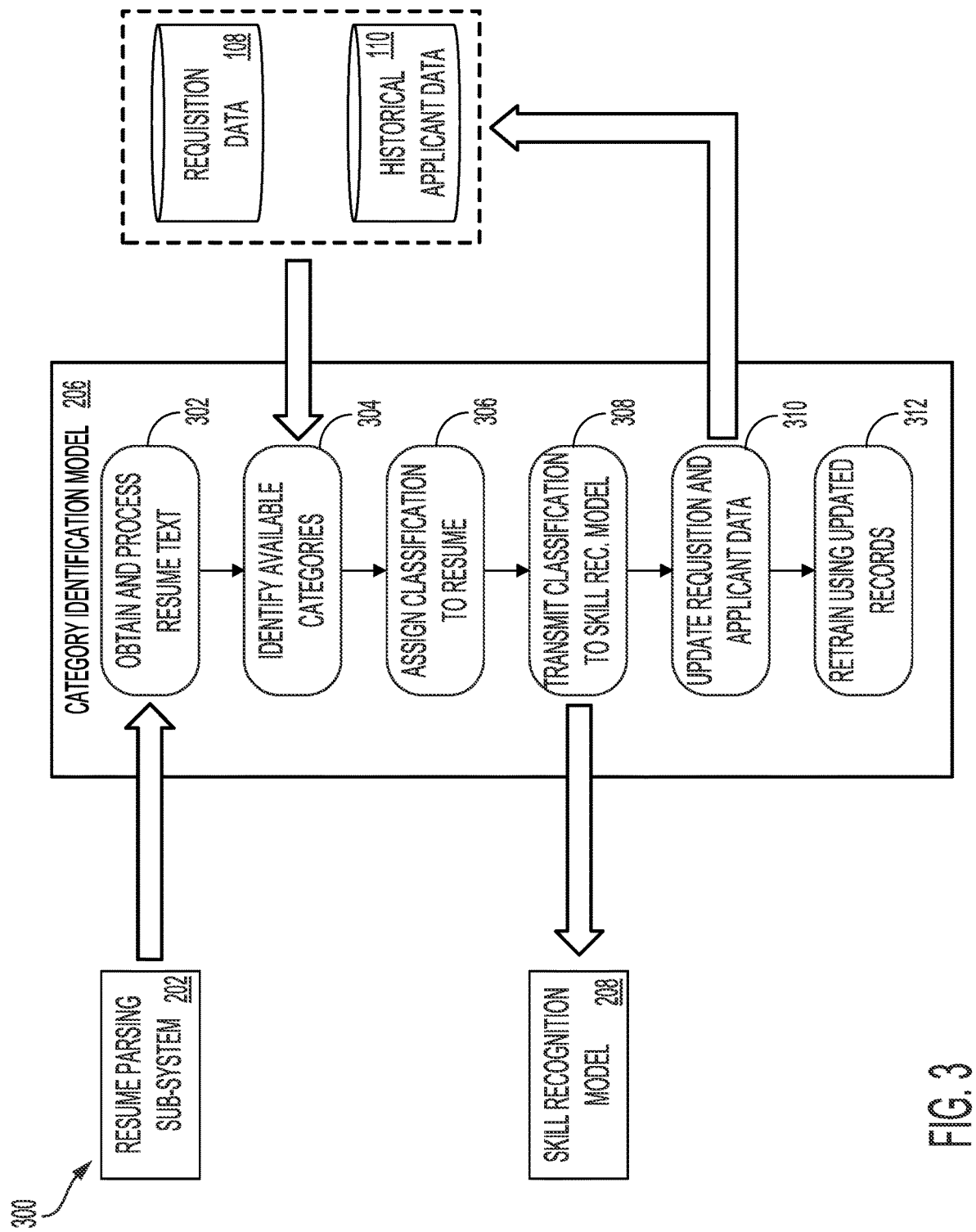
FIG. 3 shows an illustrative example of an environment in which a category identification model processes an obtained set of credentials to assign a classification that can be used to identify relevant tags for identifying one or more open requisitions applicable to the set of credentials in accordance with at least one embodiment.

FIG. 3 shows an illustrative example of an environment 300 in which a category identification model 206 processes an obtained set of credentials to assign a classification that can be used to identify relevant tags for identifying one or more open requisitions applicable to the set of credentials in accordance with at least one embodiment. In the environment 300, the category identification model 206 may, at step 302, obtain and process text associated with the set of credentials from the credential parsing sub-system 202. As noted above, the credential parsing sub-system 202 may parse through a set of credentials and/or other provided materials in order to obtain parsed text. The credential parsing sub-system 202 may implement a data object that is configured to use a provided set of credentials and/or any other materials provided by a user as input to parse these materials into text data. This data object may be configured to generate text data from various data formats. Alternatively, the credential parsing sub-system 202 may maintain different programmatic functions or data objects corresponding to the different data formats that may be processed. The credential parsing sub-system 202 may evaluate a set of credentials 118 and/or other materials to determine the data format of the set of credentials and/or other materials provided by the user and select the programmatic function or data object corresponding to an identified data format to be used to parse the set of credentials or other material into text. The credential parsing sub-system 202 may automatically transmit this text to the category identification model 206.

At step 304, the category identification model 206 may identify the available requisition category or classification tags that may be used to categorize or classify the parsed text. The category identification model 206 may automatically query a requisition data store 108 to identify the available requisition category or classification tags from which a requisition category or classification tag may be selected and assigned to the parsed text. As noted above, the requisition category or classification tags may correspond to different requisition categories or classifications for which the recruiting automation system may maintain different requisitions submitted by hiring managers, third-party systems, and other entities. For instance, when a hiring manager or other entity generates a new requisition that may be made available to potential users, the recruiting automation system may prompt the hiring manager or other entity to assign a requisition category or classification tag to the new requisition. The hiring manager or other entity may select a requisition category or classification tag from a set of known requisition category or classification tags maintained by the recruiting automation system. As an illustrative example, these tags may correspond to (but are not limited to): people, sales, enablement, security and IT, design, customer success, marketing and communications, finance accounting, data and machine learning, legal, product and program management, engineering, and the like. In some instances, a hiring manager or other entity may create a new requisition category or classification tag that may be assigned to new requisitions submitted by the hiring manager or other entity. This new requisition category or classification may be added to the set of known requisition category or classification tags maintained by the recruiting automation system.

In an embodiment, if a hiring manager or other entity defines a new requisition category or classification tag that is assigned to one or more new requisitions, the recruiting automation system can use a machine learning algorithm or artificial intelligence to automatically evaluate the new requisitions to create correlations between the new requisitions and the newly defined requisition category or classification tag. These correlations may be used to train the category identification model 206 to assign this new requisition category or classification tag to parsed text that has characteristics corresponding to the identified correlations. As an illustrative example, if a hiring manager defines a new requisition category or classification tag corresponding to aerodynamics positions, and this tag is assigned to new requisitions that are related to aerodynamics (e.g., computational fluid dynamics (CFD) modeling engineer, wind tunnel supervisor, wing planform designer, etc.), the recruiting automation system may use a machine learning algorithm or artificial intelligence to associate the new requisition category or classification tag to particular text that is related to aerodynamics (e.g., wing, CFD, planform, wind tunnel, etc.). These associations may be used to train the category identification model 206 to determine whether the parsed text corresponds to this newly created tag.

At step 306, the category identification model 206 may process the parsed text and, based on the identified requisition category or classification tags, assign a requisition category or classification tag to the parsed text. In some instances, the category identification model 206 may be based on feature similarity, whereby the category identification model 206 may determine, based on how closely features of the parsed text resemble a data set, how to classify the parsed text as being associated with a particular requisition category or classification tag.

Once the category identification model 206 has assigned a requisition category or classification tag to the parsed text, the category identification model 206, at step 308, may automatically transmit the parsed text and the assigned requisition category or classification tag to the skill recognition model 208 for further processing of the parsed text. As noted above, the skill recognition model 208 may use the requisition category or classification tag and the parsed text as input to automatically identify a set of elements from the parsed text in order to perform NER tagging of the parsed text. The tags identified using NER tagging may correspond to different skills and designations that may be used to identify and recommend one or more requisitions to a user.

In an embodiment, the category identification model 206, at step 310, can automatically update the user data store 110 to incorporate the assignment of a requisition category or classification tag to the parsed text. This assignment, along with the parsed text, may be added to the user data store 110 as a new data point such that this new data point, along with the data set of previously assigned requisition category or classification tags, may be used to retrain the category identification model 206 according to feedback provided with regard to this assignment and other assignments generated for similarly situated users and/or requisitions.

At step 312, the category identification model 206 is retrained using updated records from the user data store 110. As noted above, feedback from users and/or hiring managers may be used to retrain the category identification model 206. For instance, if the requisitions recommended to a user are rejected by the user, and the user indicates that the requisitions recommended to the user do not correspond to the type or category of requisition that the user is qualified or otherwise looking for, the recruiting automation system may use this feedback to retrain the category identification model 206 to improve the accuracy of the category identification model 206 in parsing text from a user's provided materials and in classifying the parsed text into a correct requisition category or classification. Thus, as requisitions are recommended to users based on their provided materials (e.g., sets of credentials, etc.), the category identification model 206 may be retrained in real-time based on feedback associated with these recommendations.

Figure 4:
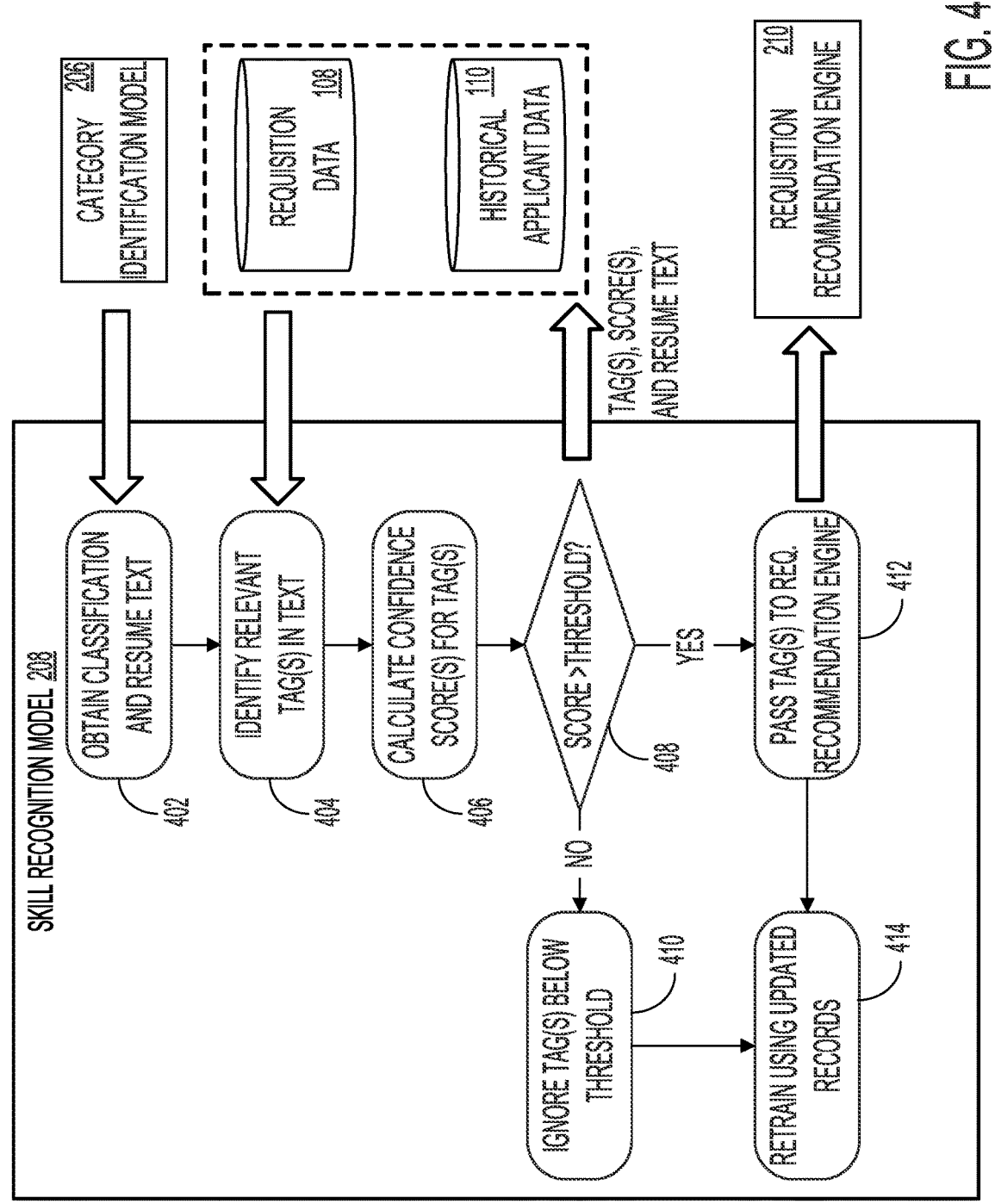
FIG. 4 shows an illustrative example of an environment in which a skill recognition model processes credential text and an assigned classification for a set of credentials in order to identify relevant tags and corresponding confidence scores in accordance with at least one embodiment.

FIG. 4 shows an illustrative example of an environment 400 in which a skill recognition model 208 processes text associated with a set of credentials and an assigned classification for a set of credentials in order to identify relevant tags and corresponding confidence scores in accordance with at least one embodiment. In the environment 400, at step 402, the skill recognition model 208 may obtain parsed text corresponding to a set of credentials or other materials provided by a user in order to obtain recommendations for requisitions that the user may apply to. Additionally, the skill recognition model 208 may receive, from the category identification model 206, a requisition category or classification tag assigned to the parsed text based on an evaluation of the parsed text.

At step 404, the skill recognition model 208 may automatically access the requisition data store 108 to identify a set of skill and designation tags that may be relevant to the parsed text. The set of skill and designation tags that may be used to assign particular tags to the parsed text may be identified based on the requisition category or classification tag assigned to the parsed text by the category identification model 206. In an embodiment, the skill recognition model 208 can identify and retrieve, from the requisition data store 108, the set of skill and designation tags that corresponds to the requisition category or classification tag assigned to the parsed text by the category identification model 206. This may limit the pool of available tags that may be used by the skill recognition model 208 to perform NER tagging of the parsed text, improving the efficiency of the skill recognition model 208 in assigning skill and designation tags to the parsed text and reduce the likelihood of inaccurate tagging of the parsed text.

Through the use of NER tagging, the skill recognition model 208 may assign one or more skill and designation tags to different names or text within the parsed text. For instance, the skill recognition model 208 may be trained used a dataset of requisition classifications/tags and corresponding parsed text that may be analyzed using NER to identify one or more entities from each parsed text data point. For example, using NER, a sample pairing of requisition category/classification tag and parsed text may be analyzed to identify a user's name, a user's location, a user's skills, years of experience, a user's degree(s), college name(s) and corresponding graduation year(s), designations (e.g., previous titles, etc.), previous employers, contact information, and the like. Each of these identified objects within the parsed text may be designated with a particular skill and designation tag. Further, for each of these tags, the skill recognition model 208 may assign a confidence score, whereby a higher confidence score denotes a greater confidence in the accuracy of the tag identification performed using NER for the particular name or string of text. The determination of confidence scores may be tuned over time, as additional data points (e.g., requisition category/classification tag and corresponding parsed text) are obtained and used to train the skill recognition model 208. Thus, at step 406, the skill recognition model 208 may use NER tagging to assign one or more skill and designation tags to the parsed text and, for each of these tags, calculate a corresponding confidence score. For a particular tag, a higher confidence score may denote a greater confidence in the accuracy in the assignment of the tag to the corresponding name or text of the parsed text.

At step 408, the skill recognition model 208 may determine, for each assigned tag, whether the confidence score for the assignment of the tag is greater than a minimum threshold value. As noted above, an administrator of the recruiting automation system may define a confidence score threshold whereby any tag having a confidence score below this threshold is automatically ignored and, thus, does not become associated with the parsed text. Additionally, certain tags, regardless of confidence score, may not be used as a factor in identifying requisitions that may be recommended to a user. For example, tags associated with a user's gender, name, college name(s), and location may not be used as factors in identifying requisitions that may be recommended to a user. These tags may be omitted to ensure anonymity of the user throughout the application process and, thus, reduce any possible bias in hiring of users. For any tags having a confidence score below the threshold value, the skill recognition model 208, at step 410, may automatically ignore these tags and, thus, not associate these tags with the parsed text.

In an embodiment, once the skill recognition model 208 has assigned a set of skill and designation tags to the parsed text, the skill recognition model 208 can update the user data store 110 to include the tags identified for the parsed text, the confidence scores corresponding to these tags, and the parsed text. This update to the user data store 110 may be evaluated according to feedback from users and hiring managers/third-party systems/etc. to determine whether the skill recognition model 208 is accurate assigning skill and designation tags to parsed text and is accurately assigning confidence scores to these tags based on the parsed text.

At step 412, the skill recognition model 208 may pass, to the requisition recommendation engine 210, the parsed text and the skill and designation tags assigned to the parsed text based on the corresponding confidence scores for these tags. Additionally, the skill recognition model 208 may pass, to the requisition recommendation engine 210, the requisition category or classification tag assigned to the parsed text by the category identification model 206. As noted above, the requisition recommendation engine 210 may process these tags using a rules-based probability model to identify one or more requisitions that may be recommended to a user. In response to obtaining the parsed text, requisition category or classification tag, and the assigned skill and designation tags, the requisition recommendation engine 210 may access the requisition data store 108 to identify existing requisitions that may be evaluated to identify one or more requisitions that may be recommended to a user.

At step 414, the skill recognition model 208 may be retrained using updated records from the user data store 110. These updated records may include feedback from users and/or hiring managers/third-party systems related to the assignment of skill and designation tags to parsed text and to the recommendation of requisitions to these users. For example, if a user rejects the requisitions recommended to the user by the requisition recommendation engine 210 (e.g., the user does not apply to any of the recommended requisitions, the user applies to requisitions that were not recommended by the requisition recommendation engine 210, etc.), the recruiting automation system may use this feedback to retrain the skill recognition model 208 to improve the identification of names or text provided in the parsed text corresponding to a user's set of credentials or other provided materials and assignment of tags to these names or text. Additionally, or alternatively, if the feedback indicates that users do not have the requisite skills and/or designations required for a requisition (e.g., the skill recognition model 208 has assigned incorrect tags to parsed text, etc.), the recruiting automation system may retrain the skill recognition model 208 to improve the accuracy of the skill recognition model 208 in assigning skill and designation tags to the parsed text, such as through improving the accuracy of the skill recognition model 208 in assigning confidence scores for particular tags to names and text provided in the parsed text. Using the example described above, if the skill recognition model 208 assigns a high confidence score to the text string "release processes" as corresponding to a release processes tag, but the text string "release processes" has a different context within the parsed text such that it may not be associated with a release processes skill, the recruiting automation system may retrain the skill recognition model 208 such that, for a "release processes" text string, the confidence score corresponding to the release processes tag may be reduced. Additionally, or alternatively, the skill recognition model 208 may be retrained such that, through NER tagging, a higher confidence score corresponding to the releases processes tag may require a text string that includes other contextual content in addition to the "release processes" text string (e.g., "internal release processes," "software release processes," "hardware release processes," etc.). Thus, as feedback is received, the skill recognition model 208 may be dynamically trained in real-time to more accurately assign tags and corresponding confidence scores to parsed text.

Figure 5:
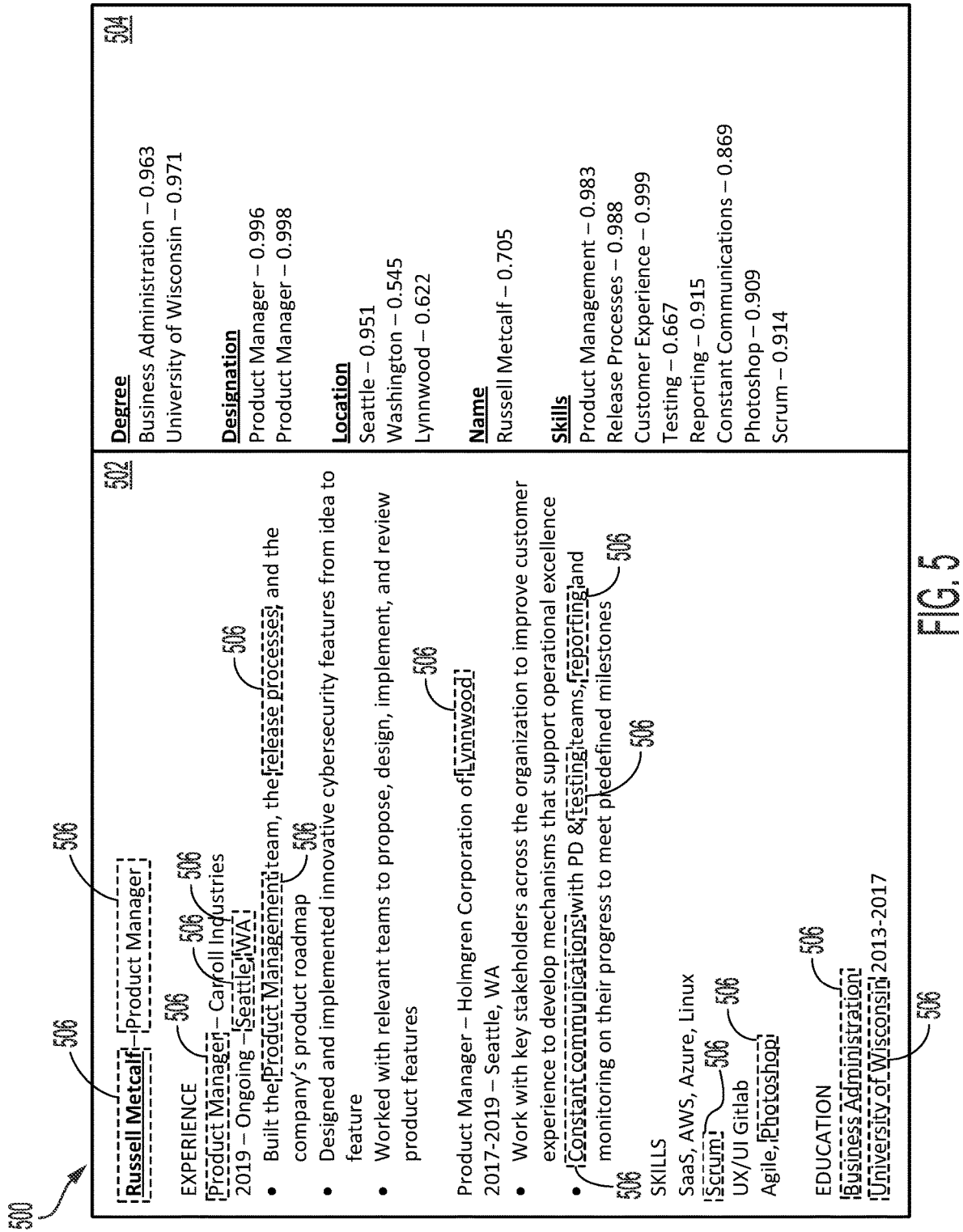
FIG. 5 shows an illustrative example of an environment in which a set of tags and corresponding confidence scores are identified based on text associated with a received set of credentials and a received classification for the set of credentials in accordance with at least one embodiment.

FIG. 5 shows an illustrative example of an environment 500 in which a set of tags 504 and corresponding confidence scores are identified based on text 506 associated with a received set of credentials 502 and a received classification for the set of credentials 502 in accordance with at least one embodiment. As illustrated in FIG. 5, parsed text corresponding to a provided set of credentials 502 may be evaluated using a skill recognition model (e.g., skill recognition model 208 described above in connection with FIGS. 2 and 4) to assign a set of tags 504 to different text strings 506 within the parsed text. Additionally, the skill recognition model 208 may assign, to each tag 504, a confidence score that may be used to denote the level of confidence in the accuracy of the tag assignment to the corresponding text string 506.

As noted above, certain tags, regardless of confidence score, may not be used as a factor in identifying requisitions that may be recommended to a user. For example, tags associated with a user's gender, name, college name(s), and location may not be used as factors in identifying requisitions that may be recommended to a user. For example, while the skill recognition model has assigned "Seattle," "Washington," and "Lynnwood" location tags and a "Russell Metcalf" name tag to particular text strings within the parsed text, and has assigned confidence scores to each of these tags, these tags may not be used as factors in identifying requisitions for the user. However, while these tags may not be used as factors in identifying requisitions that may be recommended to a user, these tags and corresponding confidence score may nevertheless be used to determine the performance of the skill recognition model and, accordingly, to retrain the skill recognition model in order to improve the accuracy of the skill recognition model in assigning tags and corresponding confidence scores for different text strings 506 within parsed text.

The confidence scores assigned to the assigned tags 504 may be used to determine which assigned tags 504 may be associated with the set of credentials 502 and used by the requisition recommendation engine to identify one or more requisitions that may be recommended to a user. As noted above, the skill recognition model may determine, for each assigned tag, whether the confidence score for the tag is greater than a minimum threshold value. Any tag having a confidence score below a pre-defined threshold may be automatically ignored and, thus, does not become associated with the set of credentials 502. For any tags having a confidence score below the threshold value, the skill recognition model may automatically ignore these tags and, thus, not associate these tags with the parsed text. However, these ignored tags and corresponding confidence scores may still be used to determine the performance of the skill recognition model and, accordingly, to retrain the skill recognition model. As illustrated in FIG. 5, for a confidence score threshold of 70% (e.g., 0.700), the assigned tags "Lynnwood" (0.622 confidence score), "Washington" (0.545 confidence score), and "Testing" (0.667 confidence score) may be automatically ignored by the skill recognition model and not associated with the set of credentials 502 as a result.

In an embodiment, the presentation of the set of credentials 502, the identified text strings 506, any assigned tags 504, and the confidence scores associated with these tags 504 may be provided to an administrator of the recruiting automation system for evaluation. For example, the elements illustrated in FIG. 5 may be provided to an administrator of the recruiting automation system through an interface, such as a graphical user interface (GUI). Through the GUI, the administrator may be presented with a graphical representation of the set of credentials 502. Within the graphical representation of the set of credentials 502, the skill recognition model may graphically highlight the text strings 506 to which different skill and designation tags 504 have been assigned through use of NER tagging. In some instances, the skill recognition model may highlight text strings according to the category or type of tag assigned to the text strings. For example, the skill recognition model may assign different colors to the different categories or types of tags that may be assigned to the text strings 506 (e.g., text strings corresponding to designation tags are highlighted in yellow, text strings corresponding to skill tags are highlighted in red, etc.). This may allow an administrator to readily determine how certain text strings 506 have been associated with particular tag categories or types by the skill recognition model. Through the interface, the administrator may also determine whether any text strings have been misclassified (e.g., assigned an incorrect tag) or have not been assigned a skill and designation tag in error. This may allow the administrator to provide feedback that may be used to retrain the skill recognition model.

Figure 6:
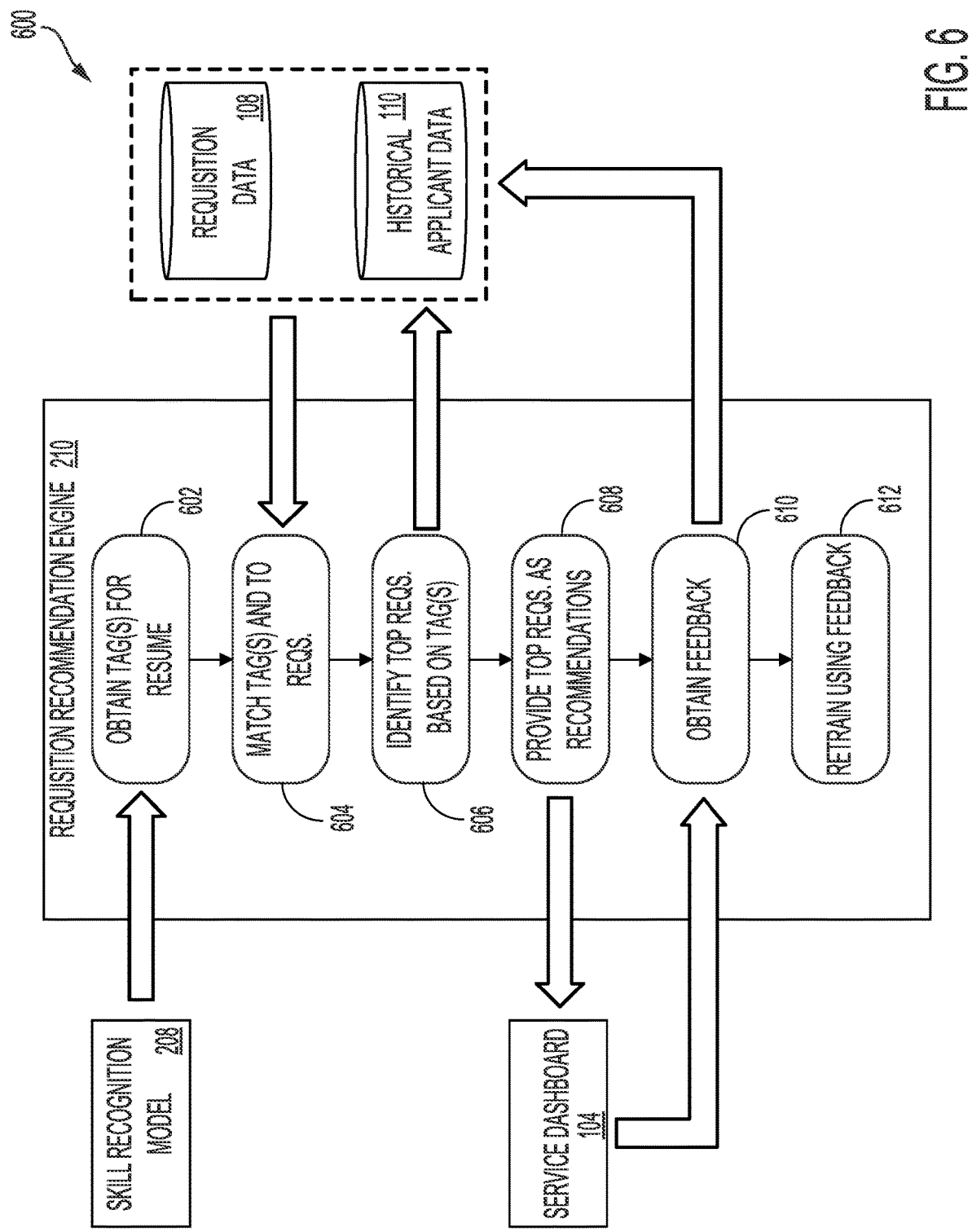
FIG. 6 shows an illustrative example of an environment in which a requisition recommendation engine automatically processes a set of tags and corresponding confidence scores for a received set of credentials in order to identify and recommend one or more open requisitions in accordance with at least one embodiment.

FIG. 6 shows an illustrative example of an environment 600 in which a requisition recommendation engine 210 automatically processes a set of tags and corresponding confidence scores for a received set of credentials in order to identify and recommend one or more open requisitions in accordance with at least one embodiment. In the environment 600, at step 602, the requisition recommendation engine 210 may obtain the parsed text corresponding to a set of credentials or other materials provided by a user, as well as the requisition category or classification tag and the skill and designation tags assigned to the parsed text by the category identification model and the skill recognition model 208, respectively. The parsed text and tags may be provided by the skill recognition model 208 automatically once the skill recognition model 208 has assigned one or more skill and designation tags to the parsed text. As noted above, the skill recognition model 208 may use NER tagging to assign one or more skill and designation tags to different names or text within the parsed text, as well as confidence scores for each of the one or more skill and designation tags assigned to the different names or text within the parsed text. The skill recognition model 208 may use these confidence scores to determine which of the assigned one or more skill and designation tags may be associated with the parsed text and passed to the requisition recommendation engine 210. For instance, the skill recognition model 208 may determine, for each assigned tag, whether the confidence score associated with the tag is greater than a pre-defined confidence score threshold. If so, the tag may be associated with the parsed text. Further, as noted above, certain tags, regardless of confidence score, may not be used as a factor in identifying requisitions that may be recommended to a user. For example, tags associated with a user's gender, name, college name(s), and location may not be used as factors in identifying requisitions that may be recommended to a user. These tags may be omitted by the skill recognition model 208 to ensure anonymity of the user throughout the application process and, thus, reduce any possible bias in hiring of users.

At step 604, the requisition recommendation engine 210 may match the skill and designation tags associated with the parsed text to the skill and designation tags associated with requisitions from the requisition data store 108. For instance, the requisition recommendation engine 210 may access the requisition data store 108 to identify existing requisitions that may be evaluated to identify one or more requisitions that may be recommended to a user. In some instances, the requisition recommendation engine 210 may query the requisition data store 108 using the assigned requisition category or classification tag to obtain the existing requisitions that are associated with the requisition category or classification tag. This may reduce the number of requisitions that are to be evaluated by the requisition recommendation engine 210, thereby improving the efficiency of the requisition recommendation engine 210 in identifying requisitions that may be recommended to a user.

As noted above, the requisition recommendation engine 210 may weigh each tag type or tag category such that particular tag types or tag categories may be accorded greater influence in identifying the requisitions that best match the user's skills and designations, as indicated in their provided materials. For example, skill tags may be assigned a greater weight compared to other tag types or tag categories, as a user's skills may serve as a greater indicator of the user's fitness for a particular requisition compared to the user's other attributes (e.g., designations, years of experience, previous employers, etc.). Further, designation tags may be assigned a weight that is less than the weight assigned to skill tags but still greater than the weights assigned to other tag types or tag categories. In some instances, a hiring manager or other entity, when creating a new requisition through the recruiting automation system, may assign a set of custom weights to the different tag types or tag categories that may be associated with the new requisition. For example, a hiring manager or other entity may manually define the level of importance for different tag types or tag categories through the assignment of specific weights to particular tag types and tag categories. Based on the level of importance or weights designated by a hiring manager or other entity for different tag types, tag categories, and/or specific tags, the recruiting automation system may define a weight schema that is specific to the new requisition. Thus, if a particular requisition is associated with a specific weight schema (as defined by a hiring manager or other entity), the requisition recommendation engine 210 may apply this specific weight schema when evaluating the tags associated with the requisition and the tags associated with the parsed text. If a requisition is not associated with a particular weight schema, the requisition recommendation engine 210 may apply a default weight schema as defined by the recruiting automation system.

The requisition recommendation engine 210 may automatically evaluate each of the requisitions obtained from the requisition data store 108 against the parsed text to identify a set of requisitions that may be recommended to the user. For instance, the requisition recommendation engine 210 may compare the tags assigned to the parsed text against the tags assigned to each of the obtained requisitions to identify a subset of requisitions that best match the parsed text (e.g., share a greater number of tags). In an embodiment, in addition to matching the tags assigned to the parsed text to the tags assigned to the different requisitions from the requisition data store 108, the requisition recommendation engine 210 automatically applies any applicable weight schema (e.g., a default weight schema, a weight schema specific to the requisition, etc.) to dynamically determine a match score for each parsed text—requisition pairing.

At step 606, the requisition recommendation engine 210 may use the resulting set of match scores to identify one or more requisitions that may be recommended to the user. For example, the requisition recommendation engine 210 may identify a pre-defined number of requisitions having the highest match scores and that, as a result, may be recommended to a user. Accordingly, the requisition recommendation engine 210 may identify the pre-defined number of requisitions having the highest match scores. The requisition recommendation engine 210 can further subdivide the pre-defined number of requisitions to create a subset of requisitions that may be defined as being the best matches for the user. For example, the recruiting automation system may define a set number of requisitions that may be designated as representing the best matches for the user based on the set of credentials and other materials provided by the user. The requisition recommendation engine 210 may automatically identify, from the pre-defined number of requisitions, the requisitions having the highest match scores (e.g., top two scores, top three scores, etc.) and designate these requisitions as being the best matches for the user.

In addition to identifying the one or more requisitions that may be recommended to a user, the requisition recommendation engine 210 may update the user data store 110 to indicate which requisitions are being recommended to the user based on the calculated match scores for the requisitions evaluated by the requisition recommendation engine 210. Further, the requisition recommendation engine 210 may update the user data store 110 to indicate the match scores for each of the requisitions evaluated by the requisition recommendation engine 210. This data may be used to retrain the requisition recommendation engine 210, as well as the category identification model 206 and skill recognition model 208, based on feedback provided by the user and/or by hiring managers/other entities that submitted the requisitions recommended to the user.

At step 608, the requisition recommendation engine 210 may provide the requisitions identified as being the best matches for the user to the user through the system dashboard 104. As noted above, the requisition recommendation engine 210 may generate a recommendation that includes the requisitions designated as being good matches for the user based on the set of credentials and other materials provided by the user. The recommendation may indicate which requisitions are to be presented to the user as being the best matches for the user. Through the system dashboard 104, the requisition recommendation engine 210 may provide, for each requisition recommended to the user, a set of details corresponding to the requisition. For example, for a particular requisition, the requisition recommendation engine 210 may present the title of the requisition, the site corresponding to the position associated with the requisition (e.g., a geographical location, remote, etc.), the name of the entity associated with the requisition (e.g., group, business unit, third-party system program, etc.), and the like. Further, for each requisition, the requisition recommendation engine 210 may indicate that the requisition is a positive match for the user. This may allow the user to easily discern recommended requisitions from other requisitions not selected by the requisition recommendation engine 210. In some instances, the requisitions designated as being the best matches for the user may be highlighted and prominently displayed through the system dashboard 104. This may allow the user to immediately identify the requisitions that represent the best matches for the user.

At step 610, the requisition recommendation engine 210 may obtain feedback with regard to the selection and presentation of the requisitions recommended to the user through the system dashboard 104. For instance, through the system dashboard 104, a user can reject the recommended requisitions (e.g., the user does not apply to any of the recommended requisitions, the user applies to requisitions that were not recommended by the requisition recommendation engine 210, etc.). This rejection of the recommended requisitions may be detected by the requisition recommendation engine 210 and incorporated in the user data store 110 as feedback that may be used to retrain the requisition recommendation engine 210. As another example, if a user applies to one or more of the recommended requisitions, the requisition recommendation engine 210 may use this action by the user as positive feedback corresponding to the recommendation of these requisitions. This feedback may also be incorporated in the user data store 110 for further training of the requisition recommendation engine 210.

Feedback may also be obtained from hiring managers, third-party systems, or other entities that submit requisitions to the recruiting automation system. For instance, a hiring manager or third-party system may provide feedback regarding the quality of users that have applied to their submitted requisitions as a result of these users having been presented with these requisitions as recommendations from the requisition recommendation engine 210. For example, if the requisition recommendation engine 210 recommends a particular requisition to a set of users, and the users within this set are not particularly well suited for the requisition, a hiring manager or third-party system may provide feedback indicating that the recommendation provided by the requisition recommendation engine 210 should not have been provided to these users. This feedback may be incorporated in the user data store 110, whereby the feedback may be used to reduce the likelihood of the requisition recommendation engine 210 recommending similar requisitions to similarly situated users.

At step 612, the requisition recommendation engine 210 may be dynamically retrained in real-time using the feedback obtained from users and from hiring managers or other entities that submitted requisitions to the recruiting automation system. For example, as users interact with the requisitions recommended to these users, the requisition recommendation engine 210 may use these interactions, along with pre-existing feedback from the user data store 110, to dynamically adjust the weight schemas used by the requisition recommendation engine 210 to match the tags associated with parsed text to different requisitions from the requisition data store 108. For instance, if the recruiting automation system determines, based on feedback from users and hiring managers, that the requisition recommendation engine 210 is recommending requisitions that do not accurately represent the users' combination of skills and designations, the recruiting automation system may adjust the weight schema used by the requisition recommendation engine 210 (e.g., reducing the weight applied to skill tags, increasing the weight applied to designation tags, increasing the weight applied to other relevant tags, etc.) to generate new match scores for requisitions for similar sets of credentials and other materials provided by users. These new match scores may be used by the requisition recommendation engine 210 to update, in real-time, the requisitions recommended to users through the system dashboard 104. For example, if the new match scores result in different requisitions being a better match for a user, the requisition recommendation engine 210 may dynamically, and in real-time, update the system dashboard 104 to present these different requisitions to the user, denoting that these different requisitions are positive matches for the user.

FIG. 7 shows an illustrative example of an interface 700 through which a set of open requisitions are recommended to a user based on the automatic processing of a provided set of credentials in accordance with at least one embodiment. As noted above, a requisition recommendation engine of the recruiting automation system may process tags associated with a set of credentials or other provided materials (e.g., parsed text) using a rules-based probability model to identify one or more requisitions that may be recommended to a user. The requisition recommendation engine may weigh each tag type or tag category according to applicable weight schemas such that certain tag types or tag categories have a greater influence on the requisition recommendation engine in identifying requisitions that may be recommended to a user. For instance, the requisition recommendation engine may apply a default weight schema to existing requisitions and the parsed text to determine the one or more requisitions that may be recommended to a user. In some instances, particular requisitions may be associated with specific weight schemas, which may cause the requisition recommendation engine to apply these specific weight schemas to these particular requisitions and the parsed text. The evaluation of tags using the aforementioned weight schemas may result in a set of match scores, whereby a match score may denote a likelihood that a user may be well suited for a requisition or that, otherwise, the requisition may be appealing to the user and aligns with the user's qualifications according to the user's provided materials.

As illustrated in FIG. 7, the requisition recommendation engine, through the interface 700, may provide the user with the requisitions that are being recommended to the user. As noted above, the requisition recommendation engine may identify a pre-defined number of requisitions that may be recommended to the user. Further, from this pre-defined number of requisitions, the requisition recommendation engine may define a set number of requisitions that may be designated as representing the best matches for the user based on the set of credentials and other materials provided by the user. The pre-defined number of requisitions, as well as the requisitions designating as being the best matches for the user, may be determined based on the match scores for these requisitions.

Through the interface 700, the requisition recommendation engine may present the recommended requisitions, including the set number of requisitions that may be designated as representing the best matches for the user. For example, as illustrated in FIG. 7, the requisition recommendation engine may prominently highlight a requisition corresponding to a "Managed Services Account Executive" position as being the best match for the user. This requisition may include a "Best Match" indicator, which may alert the user of the requisition being the best match for the user based on the user's provided materials. Further, as illustrated in FIG. 7, the requisition may be highlighted to further differentiate the requisition from other requisitions being recommended to the user.

Through the interface 700 associated with the system dashboard, the requisition recommendation engine may provide, for each requisition, a set of details corresponding to the requisition. For example, for a particular requisition, the requisition recommendation engine may present the title of the requisition, the site corresponding to the position associated with the requisition (e.g., a geographical location, remote, etc.), the name of the entity associated with the requisition (e.g., group, business unit, third-party system program, etc.), and the like. Further, for each requisition, the requisition recommendation engine may indicate that the requisition is a positive match for the user (e.g., "Good Match," "Best Match," etc.). This may allow the user to easily discern recommended requisitions from other requisitions not selected by the requisition recommendation engine.

Using the interface 700, a user may apply to any of the presented requisitions. For example, as illustrated in FIG. 7, each requisition may include an apply button (e.g., "Quick Apply" button, "Apply" button, etc.). A user may select an apply button corresponding to a requisition to submit an application to the requisition. For instance, if the user selects an apply button, the recruiting automation system may automatically transfer the user to a bot recruiting agent that may be configured to solicit responses to questions submitted by a hiring manager that generated the requisition via the recruiting automation system. Additionally, the recruiting automation system may obtain, from a user data store, the set of credentials and any other materials provided by the user to initiate the process of generating recommendations for requisitions that may serve as best matches for the user.

As users interact with the requisitions recommended to these users through the interface 700, the requisition recommendation engine may use these interactions, along with pre-existing feedback from the user data store, to dynamically adjust the weight schemas used by the requisition recommendation engine to match the tags associated with parsed text to different requisitions from the requisition data store. For instance, if the recruiting automation system determines, based on feedback from users and hiring managers, that the requisition recommendation engine is recommending requisitions that do not accurately represent the users' combination of skills and designations, the recruiting automation system may dynamically, and automatically, adjust the weight schema used by the requisition recommendation engine (e.g., reducing the weight applied to skill tags, increasing the weight applied to designation tags, increasing the weight applied to other relevant tags, etc.) to generate new match scores for requisitions for similar sets of credentials and other materials provided by users. These new match scores may be used by the requisition recommendation engine to update, in real-time, the requisitions recommended to users through the interface 700. For example, if the new match scores result in different requisitions being a better match for a user, the requisition recommendation engine may dynamically, and in real-time, update the interface 700 to present these different requisitions to the user, denoting that these different requisitions are positive matches for the user.

Figure 8:
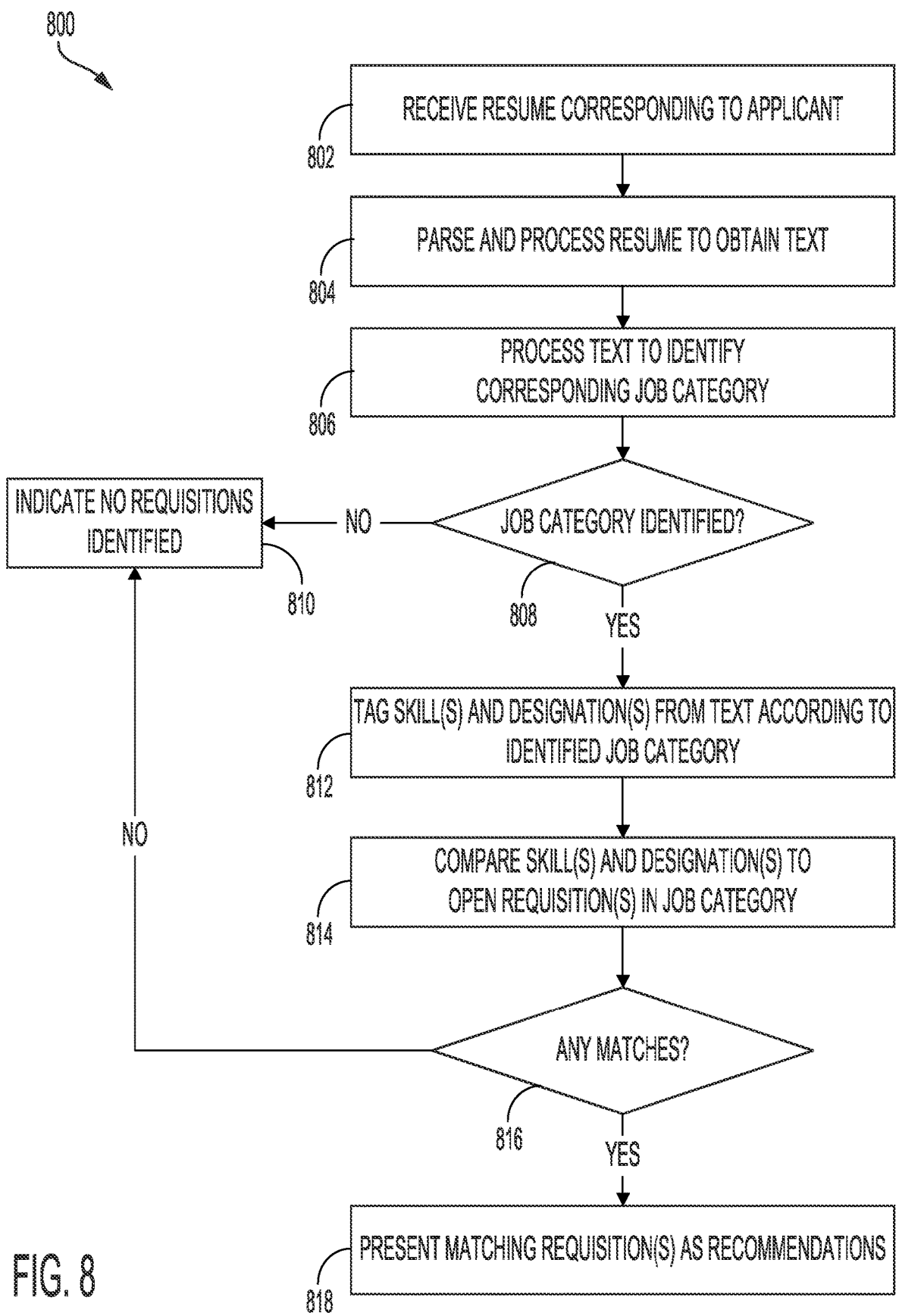
FIG. 8 shows an illustrative example of a process through which a set of machine learning models automatically process a received set of credentials in order to identify and recommend one or more open requisitions in accordance with at least one embodiment.

FIG. 8 shows an illustrative example of a process 800 through which a set of machine learning models automatically process a received set of credentials in order to identify and recommend one or more open requisitions in accordance with at least one embodiment. The process 800 may be performed by a credential analysis engine implemented by the recruiting automation system. As noted above, the credential analysis engine may include a machine learning system that comprises a category identification model and a skill recognition model. These models are trained to dynamically assign a requisition category or classification tag to a user's set of credentials or other provided materials, as well as to assign skill and designation tags according to the text parsed from the set of credentials or other provided materials. These tags may be used to identify one or more requisitions that may be recommended to the user.

At step 802, the credential analysis engine may receive a set of credentials corresponding to a user that is seeking to identify one or more requisitions that match the user's skills and designations. As noted above, the recruiting automation system can provide the user with an option to upload or otherwise provide a set of credentials or other materials (e.g., sample work product, publications, etc.) that may be used to automatically identify one or more requisitions that may be recommended to the user. For example, when a user accesses a system dashboard provided by the recruiting automation system, the recruiting automation system may prompt the user to submit a query that may be processed to identify, from a requisition data store, one or more existing requisitions that the user may apply for. Additionally, the recruiting automation system may provide one or more options to upload or otherwise submit a set of credentials and/or other materials that may be processed to identify one or more existing requisitions that may be recommended to the user and that the user may apply for. If the user uploads a set of credentials and/or other materials to the recruiting automation system, the recruiting automation system may automatically provide the set of credentials and/or other materials to the credential analysis engine for processing.

At step 804, the credential analysis engine, through a set of credentials parsing sub-system, may parse and process the provided set of credentials and/or other materials to obtain a set of parsed text. The credential parsing sub-system may implement a data object that is configured to use a provided set of credentials and/or any other materials provided by a user as input to parse these materials into text data. This data object may be configured to generate text data from various data formats. Alternatively, the credential parsing sub-system may maintain different programmatic functions or data objects corresponding to the different data formats that may be processed. The credential parsing sub-system may evaluate a set of credentials and/or other materials to determine the data format of the set of credentials and/or other materials provided by the user and select the programmatic function or data object corresponding to an identified data format to be used to parse the set of credentials or other material into text. Once the credential parsing sub-system has obtained parsed text through processing of the provided set of credentials and/or other materials, the credential parsing sub-system may automatically transmit this parsed text to the category identification model.

At step 806, the credential analysis engine, through the category identification model, may process the parsed text to identify a requisition category or classification for the parsed text. In an embodiment, in response to receiving the parsed text, the category identification model automatically queries a requisition data store to identify the available requisition category or classification tags from which a requisition category or classification tag may be selected and assigned to the parsed text. As noted above, the requisition category or classification tags may correspond to different requisition categories or classifications for which the recruiting automation system may maintain different requisitions submitted by hiring managers, third-party systems, and other entities. As an illustrative example, these tags may correspond to (but are not limited to): people, sales, enablement, security and IT, design, customer success, marketing and communications, finance accounting, data and machine learning, legal, product and program management, engineering, and the like.

At step 808, the credential analysis engine may determine whether a requisition category or classification has been identified for the parsed text. If the category identification model is unable to assign a requisition category or classification tag to the parsed text (e.g., the parsed text does not correspond to any of the available requisition categories or classifications maintained by the recruiting automation system), the credential analysis engine may determine that there are no existing requisitions that match the parsed text. As noted above, when a hiring manager or other entity generates a new requisition that may be made available to potential users, the recruiting automation system may prompt the hiring manager or other entity to assign a requisition category or classification tag to the new requisition. The hiring manager or other entity may select a requisition category or classification tag from a set of known requisition category or classification tags maintained by the recruiting automation system. Further, if a hiring manager or other entity defines a new requisition category or classification tag that is assigned to one or more new requisitions, the recruiting automation system can use a machine learning algorithm or artificial intelligence to automatically evaluate the new requisitions to create correlations between the new requisitions and the newly defined requisition category or classification tag. These correlations may be used to train the category identification model to assign this new requisition category or classification tag to parsed text that has characteristics corresponding to the identified correlations. This application of requisition category or classification tags to existing requisitions may serve as an indication that these existing requisitions are associated with these tags. Thus, if the parsed text does not correspond to any of these requisition category or classification tags, the credential analysis engine may determine that the parsed text does not match any of the existing requisitions. Accordingly, at step 810, the credential analysis engine may indicate that no requisitions have been identified for the user.

If the credential analysis engine determines that the category identification model has identified and assigned a requisition category or classification tag to the parsed text, the credential analysis engine may provide the parsed text and the assigned requisition category or classification tag to a skill recognition model. The skill recognition model, at step 812, may assign one or more skill and designation tags to names or text strings within the parsed text. For instance, the skill recognition model may automatically access the requisition data store to identify a set of skill and designation tags that may be relevant to the parsed text. The set of skill and designation tags that may be used to assign particular tags to the parsed text may be identified based on the requisition category or classification tag assigned to the parsed text by the category identification model. For instance, the skill recognition model may query the requisition data store using the requisition category or classification tag to identify a set of skill and designation tags that are associated with the particular requisition category or classification tag.

The skill recognition model may use NER tagging to assign the one or more skill and designation tags to different names or text strings within the parsed text. For example, using NER tagging, the parsed text may be analyzed to identify a user's name, a user's location, a user's skills, years of experience, a user's degree(s), college name(s) and corresponding graduation year(s), designations (e.g., previous titles, etc.), previous employers, contact information, and the like. Each of these identified objects within the parsed text may be designated with a particular skill and designation tag. Further, for each of these tags, the skill recognition model may assign a confidence score, whereby a higher confidence score may denote a greater confidence in the accuracy of the tag identification performed using NER tagging for the particular name or text string. In an embodiment, once the skill recognition model has assigned tags and corresponding confidence scores to the various names or text strings in the parsed text, the skill recognition model can determine whether the confidence score for each of these tags is greater than a minimum confidence score threshold value. For any tags having a confidence score below the threshold value, the skill recognition model may automatically ignore these tags and, thus, not associate these tags with the parsed text. Additionally, the skill recognition model may automatically omit certain tags regardless of confidence score, such as tags associated with a user's gender, name, college name(s), and location.

Once the skill recognition model has identified the one or more skill and designation tags that may be associated with the parsed text, the skill recognition model may provide these one or more skill and designation tags, the requisition category or classification tag, and the parsed text to the requisition recommendation engine. The requisition recommendation engine, at step 814, may compare the skill and designation tags associated with the parsed text to the skill and designation tags assigned to existing requisitions from the requisition data store. For instance, the requisition recommendation engine may compare the tags assigned to the parsed text against the tags assigned to each of the obtained requisitions to identify a subset of requisitions that best match the parsed text (e.g., share a greater number of tags). In some examples, the requisition recommendation engine may automatically apply any applicable weight schema (e.g., a default weight schema, a weight schema specific to the requisition, etc.) to dynamically determine a match score for each parsed text—requisition pairing.

The requisition recommendation engine, at step 816, may use the resulting set of match scores to determine whether one or more requisitions may be recommended to the user. For example, the requisition recommendation engine may determine whether any of the match scores are greater than a minimum match score threshold for identifying requisitions that may be recommended to a user. If the resulting match scores are all below the minimum match score threshold, the requisition recommendation engine may determine that no matching requisitions have been identified. Accordingly, the requisition recommendation engine, at step 810, may indicate that no requisitions have been identified for the user.

As noted above, the requisition recommendation engine may identify a pre-defined number of requisitions having the highest match scores and that, as a result, may be recommended to a user. Accordingly, the requisition recommendation engine may identify the pre-defined number of requisitions having the highest match scores. The requisition recommendation engine can further subdivide the pre-defined number of requisitions to create a subset of requisitions that may be defined as being the best matches for the user. For example, the recruiting automation system may define a set number of requisitions that may be designated as representing the best matches for the user based on the set of credentials and other materials provided by the user. The requisition recommendation engine may automatically identify, from the pre-defined number of requisitions, the requisitions having the highest match scores (e.g., top two scores, top three scores, etc.) and designate these requisitions as being the best matches for the user.

At step 818, the requisition recommendation engine of the credential analysis engine may present the matching requisitions as recommendations to the user. For instance, the requisition recommendation engine may generate a recommendation that includes the requisitions designated as being good matches for the user based on the set of credentials and other materials provided by the user. The recommendation may indicate which requisitions are to be presented to the user as being the best matches for the user. Through the system dashboard, the requisition recommendation engine may provide, for each requisition recommended to the user, a set of details corresponding to the requisition. Further, for each requisition, the requisition recommendation engine may indicate that the requisition is a positive match for the user. This may allow the user to easily discern recommended requisitions from other requisitions not selected by the requisition recommendation engine In some instances, the requisitions designated as being the best matches for the user may be highlighted and prominently displayed through the system dashboard. This may allow the user to immediately identify the requisitions that represent the best matches for the user.

Figure 9:
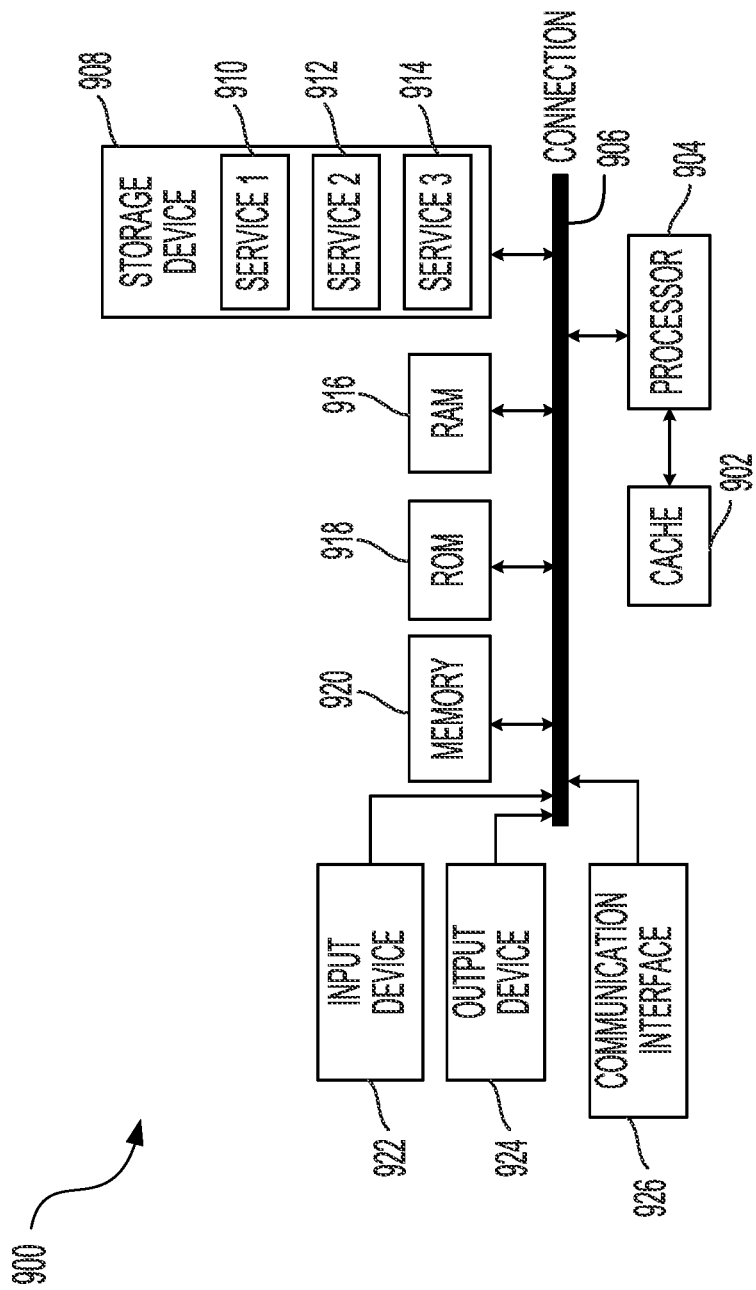
FIG. 9 shows an illustrative example of an environment in which various embodiments can be implemented.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the user reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices.

The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
receiving a set of credentials associated with a user, wherein the set of credentials identifies a set of characteristics associated with the user;
applying a category identification model to the set of credentials to generate a requisition category associated with the user, wherein the requisition category identifies a domain for the set of credentials, and wherein the category identification model is trained using previously processed sets of credentials and their respective requisition categories;
applying a skill recognition model to the requisition category and the set of credentials after the category identification model generates the requisition category, wherein the skill recognition model generates a plurality of candidate tags associated with the domain identified by the requisition category, wherein the plurality of candidate tags identify skills associated with the set of characteristics, and wherein the skill recognition model is trained using the previously processed sets of credentials and their respective tags;
removing a set of candidate tags from the plurality of candidate tags after the skill recognition model generates the plurality of candidate tags, wherein the set of candidate tags include personal identifiable information associated with the user, and wherein the set of candidate tags are removed to generate one or more anonymized tags for the set of credentials;
identifying one or more open requisitions using the one or more anonymized tags;
ranking the one or more open requisitions according to confidence scores associated with the one or more anonymized tags;
receiving feedback associated with a third-party system, wherein the feedback includes an indication of whether the user qualifies for the one or more open requisitions;
updating the category identification model and the skill recognition model using the one or more open requisitions and the feedback; and
updating the skill recognition model using the one or more anonymized tags, wherein updating the skill recognition model reduces bias associated with determining whether the user qualifies for the one or more open requisitions.

2. The computer-implemented method of claim 1, wherein the skill recognition model processes the set of credentials using named entity recognition to generate the plurality of candidate tags.

3. The computer-implemented method of claim 1, wherein identifying the one or more open requisitions includes matching the one or more anonymized tags to a set of requisitions to identify the one or more open requisitions.

4. The computer-implemented method of claim 1, wherein the one or more anonymized tags are associated with one or more skills, and wherein the one or more skills correspond to the one or more open requisitions.

5. The computer-implemented method of claim 1, further comprising:
obtaining a set of requisitions; and
assigning requisition tags to the set of requisitions, wherein the one or more anonymized tags are matched to the requisition tags to identify the one or more open requisitions.

6. The computer-implemented method of claim 1, wherein the one or more anonymized tags are generated to determine whether the user qualifies for requisitions associated with the third-party system.

7. The computer-implemented method of claim 1, wherein the category identification model and the skill recognition model are updated to increase a probability that the user qualifies for requisitions associated with the third-party system.

8. The computer-implemented method of claim 1, further comprising:
determining confidence scores for the one or more anonymized tags, wherein the confidence scores are determined by processing the set of credentials using the skill recognition model, wherein the confidence scores indicate an extent to which the one or more anonymized tags accurately describe the set of characteristics, and wherein the one or more open requisitions are identified further based on the confidence scores.

9. The computer-implemented method of claim 1, further comprising:
determining a set of weights for the one or more anonymized tags, wherein the set of weights are determined based on a weight schema generated by the third-party system, and wherein the one or more open requisitions are identified further based on the set of weights.

10. A system, comprising:
one or more processors; and
memory storing thereon instructions that, as a result of being executed by the one or more processors, cause the system to:
receive a set of credentials associated with a user, wherein the set of credentials identifies a set of characteristics associated with the user;
apply a category identification model to the set of credentials to generate a requisition category associated with the user, wherein the requisition category identifies a domain for the set of credentials, and wherein the category identification model is trained using previously processed sets of credentials and their respective requisition categories;
apply a skill recognition model to the requisition category and the set of credentials after the category identification model generates the requisition category, wherein the skill recognition model generates a plurality of candidate tags associated with the domain identified by the requisition category, wherein the plurality of candidate tags identify skills associated with the set of characteristics, and wherein the skill recognition model is trained using the previously processed sets of credentials and their respective tags;
remove a set of candidate tags from the plurality of candidate tags after the skill recognition model generates the plurality of candidate tags, wherein the set of candidate tags include personal identifiable information associated with the user, and wherein the set of candidate tags are removed to generate one or more anonymized tags for the set of credentials;
identify one or more open requisitions using the one or more anonymized tags;
rank the one or more open requisitions according to confidence scores associated with the one or more anonymized tags;
receive feedback associated with a third-party system, wherein the feedback includes an indication of whether the user qualifies for the one or more open requisitions;
update the category identification model and the skill recognition model using the one or more open requisitions and the feedback; and
update the skill recognition model using the one or more anonymized tags, wherein updating the skill recognition model reduces bias associated with determining whether the user qualifies for the one or more open requisitions.

11. The system of claim 10, wherein the skill recognition model processes the set of credentials using named entity recognition to generate the plurality of candidate tags.

12. The system of claim 10, wherein identifying the one or more open requisitions includes matching the one or more anonymized tags to a set of requisitions to identify the one or more open requisitions.

13. The system of claim 10, wherein the one or more anonymized tags are associated with one or more skills, and wherein the one or more skills correspond to the one or more open requisitions.

14. The system of claim 10, wherein the instructions further cause the system to:
obtain a set of requisitions; and
assign requisition tags to the set of requisitions, wherein the one or more anonymized tags are matched to the requisition tags to identify the one or more open requisitions.

15. The system of claim 10, wherein the category identification model and the skill recognition model are updated to increase a probability that the user qualifies for requisitions associated with the third-party system.

16. The system of claim 10, wherein the instructions further cause the system to:
determine confidence scores for the one or more anonymized tags, wherein the confidence scores are determined by processing the set of credentials using the skill recognition model, wherein the confidence scores indicate an extent to which the one or more anonymized tags accurately describe the set of characteristics, and wherein the one or more open requisitions are identified further based on the confidence scores.

17. The system of claim 10, wherein the instructions further cause the system to:
determine a set of weights for the one or more anonymized tags, wherein the set of weights are determined based on a weight schema generated by the third-party system, and wherein the one or more open requisitions are identified further based on the set of weights.

18. A non-transitory, computer-readable storage medium storing thereon executable instructions that, as a result of being executed by one or more processors of a computer system, cause the computer system to:
receive a set of credentials associated with a user, wherein the set of credentials identifies a set of characteristics associated with the user;
apply a category identification model to the set of credentials to generate a requisition category associated with the user, wherein the requisition category identifies a domain for the set of credentials, and wherein the category identification model is trained using previously processed sets of credentials and their respective requisition categories;
apply a skill recognition model to the requisition category and the set of credentials after the category identification model generates the requisition category, wherein the skill recognition model generates a plurality of candidate tags associated with the domain identified by the requisition category, wherein the plurality of candidate tags identify skills associated with the set of characteristics, and wherein the skill recognition model is trained using the previously processed sets of credentials and their respective tags;

remove a set of candidate tags from the plurality of candidate tags after the skill recognition model generates the plurality of candidate tags, wherein the set of candidate tags include personal identifiable information associated with the user, and wherein the set of candidate tags are removed to generate one or more anonymized tags for the set of credentials;

identify one or more open requisitions using the one or more anonymized tags;

rank the one or more open requisitions according to confidence scores associated with the one or more anonymized tags;

receive feedback associated with a third-party system, wherein the feedback includes an indication of whether the user qualifies for the one or more open requisitions;

update the category identification model and the skill recognition model using the one or more open requisitions and the feedback; and update the skill recognition model using the one or more anonymized tags, wherein updating the skill recognition model reduces bias associated with determining whether the user qualifies for the one or more open requisitions.

19. The non-transitory, computer-readable storage medium of claim 18, wherein the skill recognition model processes the set of credentials using named entity recognition to generate the plurality of candidate tags.

20. The non-transitory, computer-readable storage medium of claim 18, wherein the one or more open requisitions includes matching the one or more anonymized tags to a set of requisitions to identify the one or more open requisitions.

21. The non-transitory, computer-readable storage medium of claim 18, wherein the one or more anonymized tags are associated with one or more skills, and wherein the one or more skills correspond to the one or more open requisitions.

22. The non-transitory, computer-readable storage medium of claim 18, wherein the executable instructions further cause the computer system to:
obtain a set of requisitions; and
assign requisition tags to the set of requisitions, wherein the one or more anonymized tags are matched to the requisition tags to identify the one or more open requisitions.

23. The non-transitory, computer-readable storage medium of claim 18, wherein the executable instructions further cause the computer system to:
determine confidence scores for the one or more anonymized tags, wherein the confidence scores are determined by processing the set of credentials using the skill recognition model, wherein the confidence scores indicate an extent to which the one or more anonymized tags accurately describe the set of characteristics, and wherein the one or more open requisitions are identified further based on the confidence scores.

24. The non-transitory, computer-readable storage medium of claim 18, wherein the executable instructions further cause the computer system to:
determine a set of weights for the one or more anonymized tags, wherein the set of weights are determined based on a weight schema generated by the third-party system, and wherein the one or more open requisitions are identified further based on the set of weights.

* * * * *